United States Patent
Korn

(10) Patent No.: US 9,558,733 B1
(45) Date of Patent: Jan. 31, 2017

(54) AUDIBLY INDICATING SECONDARY CONTENT WITH SPOKEN TEXT

(71) Applicant: Amazon Technologies, Inc., Seattle, WA (US)

(72) Inventor: Peter Alex Korn, Oakland, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 143 days.

(21) Appl. No.: 14/499,407

(22) Filed: Sep. 29, 2014

(51) Int. Cl.
*G10L 13/00* (2006.01)

(52) U.S. Cl.
CPC ..................... *G10L 13/00* (2013.01)

(58) Field of Classification Search
CPC ............. G10L 13/00; G10L 17/30014
USPC ........................................... 704/260
See application file for complete search history.

(56) References Cited

U.S. PATENT DOCUMENTS

| 7,546,524 | B1* | 6/2009 | Bryar | G06F 3/04883 715/230 |
| 8,132,094 | B1* | 3/2012 | Bryar | G06F 3/04883 715/230 |
| 8,627,196 | B1* | 1/2014 | Bryar | G06F 3/04883 715/229 |
| 8,826,137 | B2 | 9/2014 | Hofstader | |
| 9,245,254 | B2* | 1/2016 | Lord | H04L 12/1831 |
| 2009/0254345 | A1 | 10/2009 | Fleizach et al. | |

* cited by examiner

*Primary Examiner* — Susan McFadden
(74) *Attorney, Agent, or Firm* — Seyfarth Shaw LLP; Ilan N. Barzilay; Cyrus A. Miller

(57) ABSTRACT

A system and method for adding audio indicators, such as an audio tone, to audio data corresponding to text. The audio indicator corresponds to secondary content in text, such as a footnote. The system will insert and/or modify a textual indicator at a location in the text corresponding to the secondary content. The system will then process the textual indicator during text-to-speech processing of the text so that an audio tone is output at a moment in speech data corresponding to the location of the secondary content in the text. A speech synthesis markup language may be used to create and/or modify the textual indicator.

20 Claims, 16 Drawing Sheets

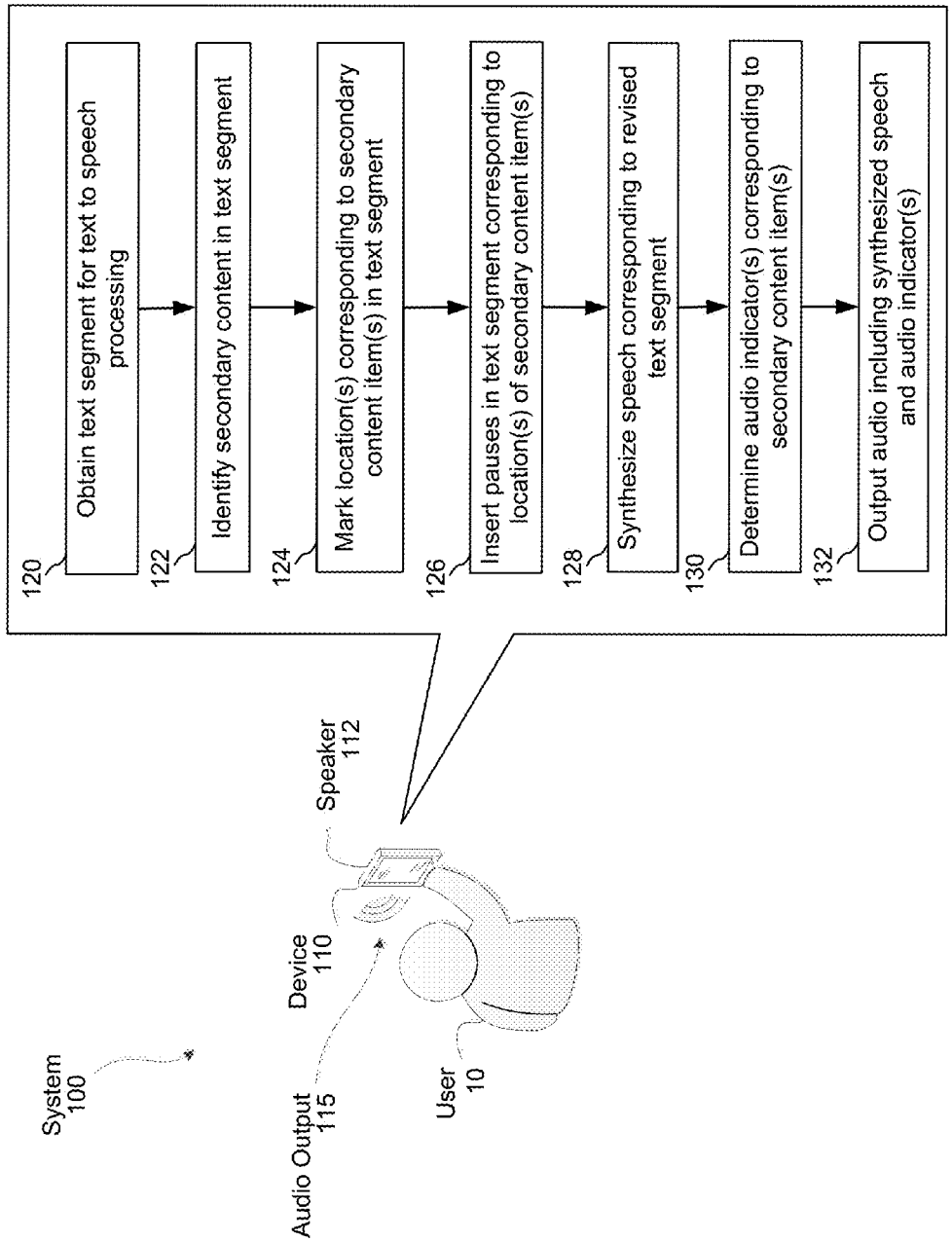

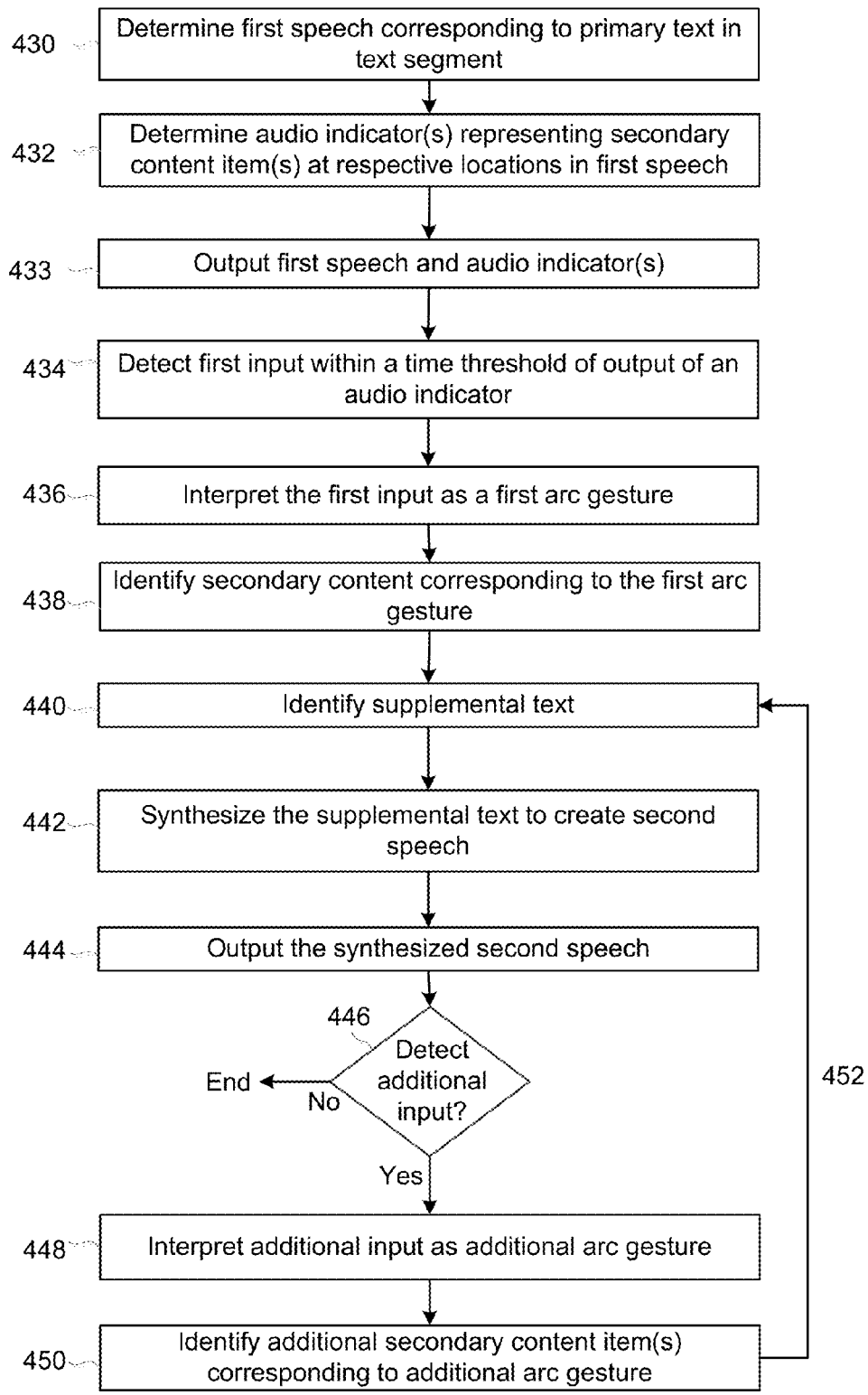

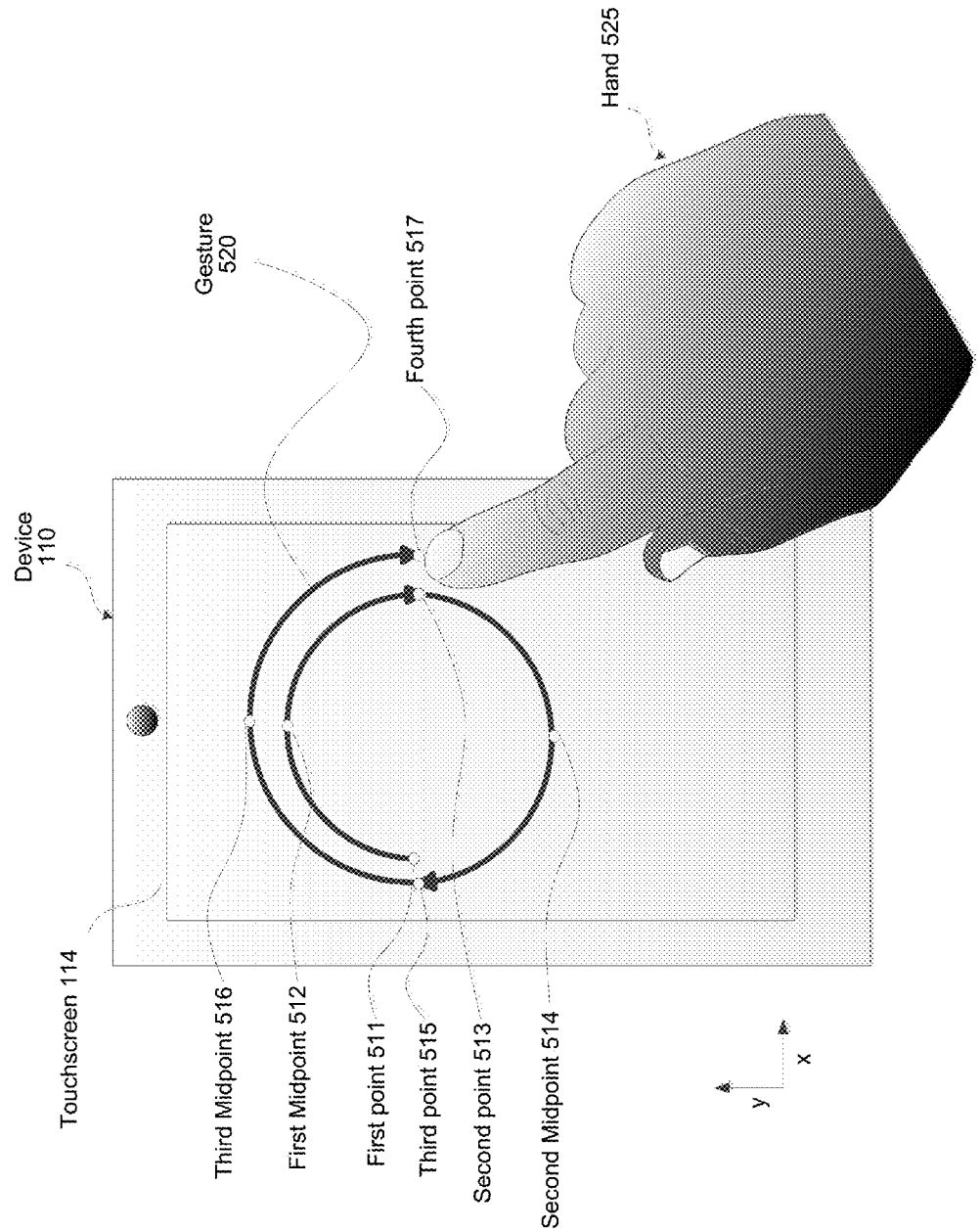

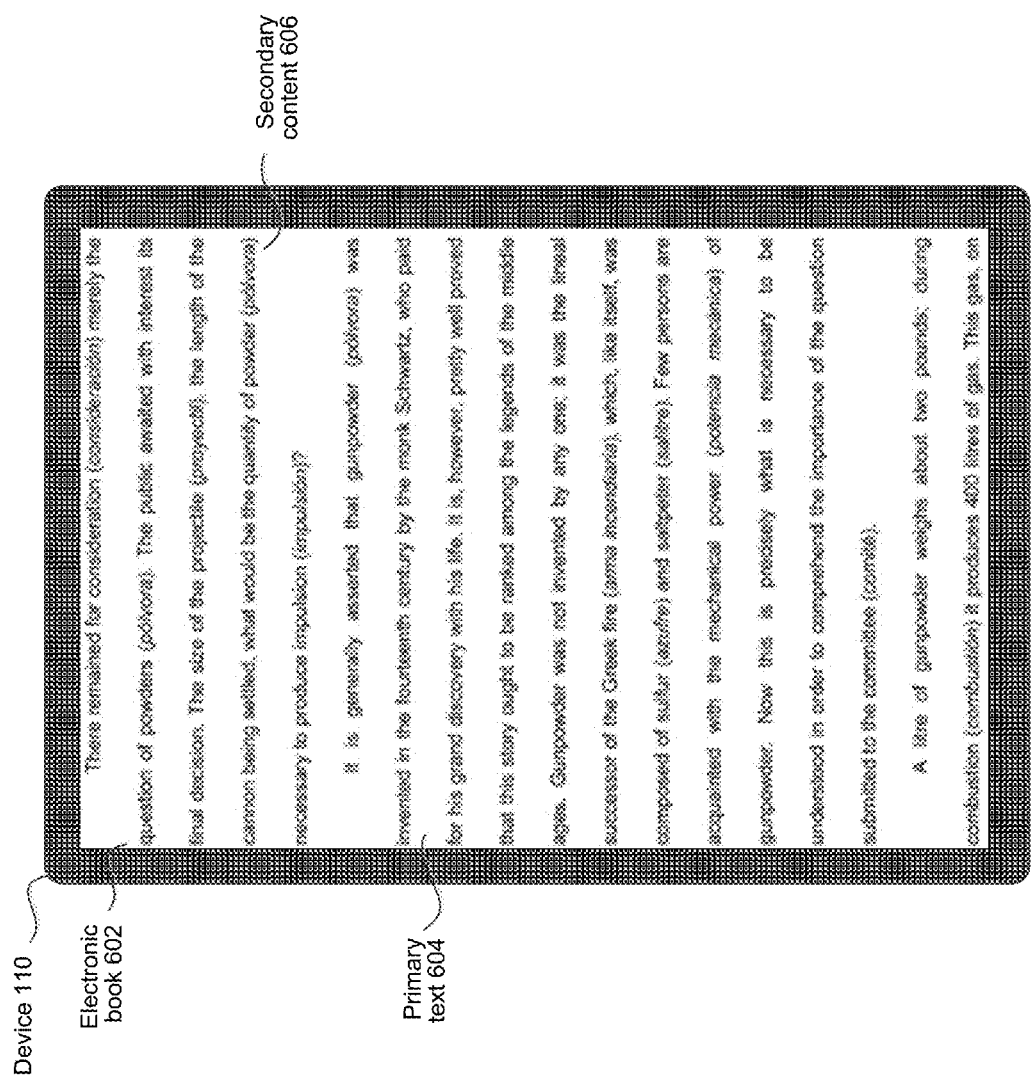

AUDIBLY INDICATING SECONDARY CONTENT WITH SPOKEN TEXT

BACKGROUND

Electronic devices such as computers, smart phones and electronic readers may display books and other text based documents.

BRIEF DESCRIPTION OF DRAWINGS

For a more complete understanding of the present disclosure, reference is now made to the following description taken in conjunction with the accompanying drawings.

FIG. 1A illustrates a system for audibly indicating secondary content within spoken text using an electronic device.

FIG. 4B illustrates a flowchart of a method for navigating secondary content using gestures.

FIG. 5A illustrates an example of a gesture that may be used to navigate between different levels of secondary content or different menu items.

FIGS. 6-8 illustrate a device displaying an electronic book with different secondary content.

DETAILED DESCRIPTION

Figure 1B:
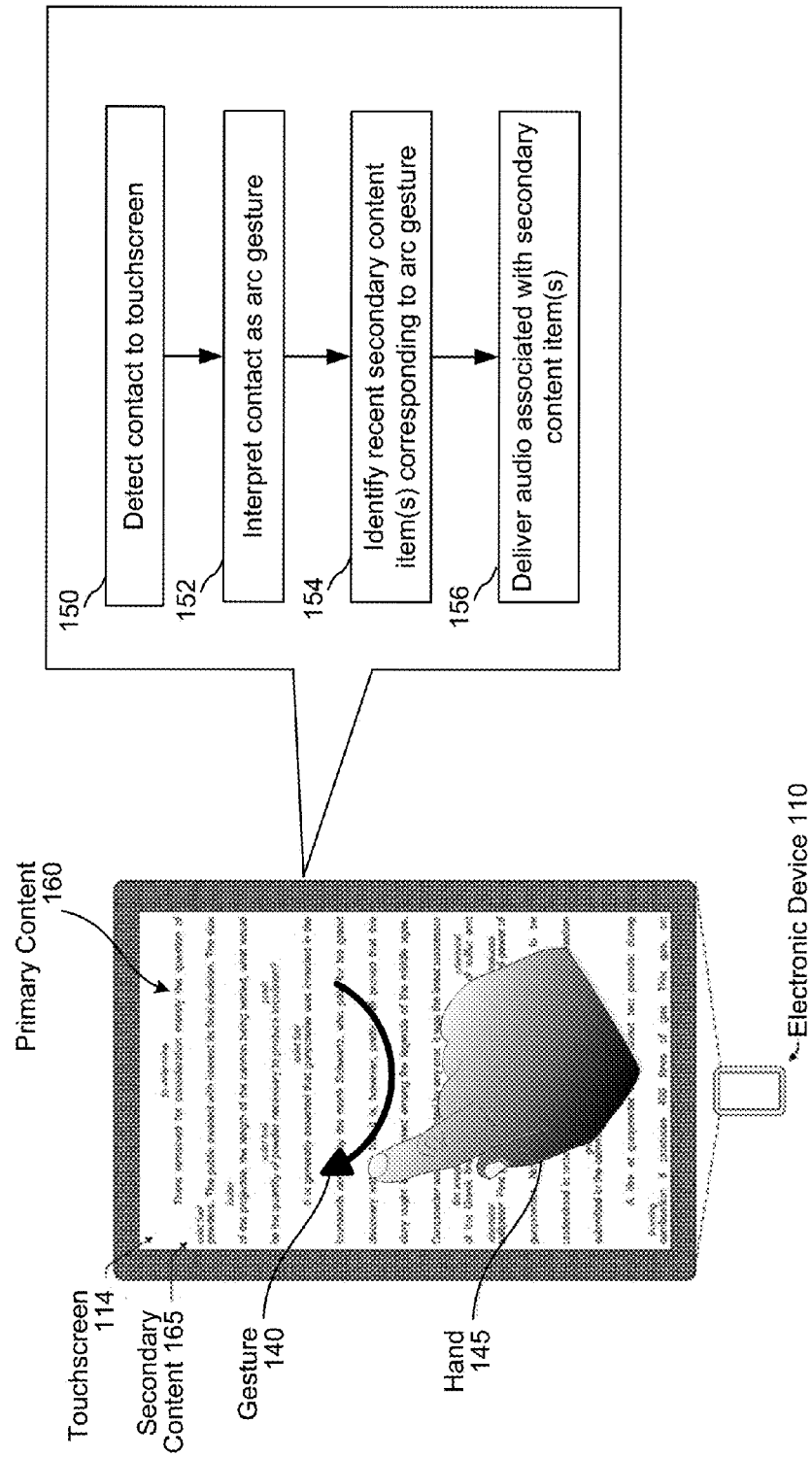
FIG. 1B illustrates a gesture for navigating secondary content for users operating an electronic device.

Traditional paper media such as books and other text based documents may display the content of the document which may include both primary text and secondary content. For example, the primary text may include the main passage(s) of the document whereas the secondary content may include footnotes, endnotes, annotations, or the like that relate to, but may be separate from the primary text. A text string (i.e., series of characters) of the document may include both primary text and indicators of secondary content (such as the footnote symbols). When displayed on an electronic device, such as an e-reader, the secondary content of a document may be displayed in a manner similar to the paper media. Further, electronic devices may display additional supplemental content, which may not necessarily be part of the original document, but may be added to enhance the reader's experience when consuming electronic media. Such supplemental content may include later added definitions, synonyms, translations, user notes, and/or other added items that may be added to a document and displayed electronically. This supplemental content may also refer back to the primary text. The supplemental content may also be considered a type of secondary content. Thus, a document may be associated with secondary content that is included in the original document as well as secondary content that is added later (i.e., supplemental content). So while some of the secondary content may be included in the document as published, such as a footnotes and endnotes included in the original publication, other secondary content may be added to a document and displayed by an electronic device, such as later added suggested definitions, synonyms, annotations, etc. Further, the primary text of the document may include original formatting, such as font variations (bold, italics, underlines, etc.), while additional formatting may be added to the primary text later (such as highlighting, user comments or external comments from other users). For purposes of this disclosure, the main text of the document may be referred to as the primary text, while all other formatting, footnotes, endnotes, supplemental content or other information may be referred to as secondary content.

As a visual interface is capable of concurrently displaying multiple pieces of information, all of this secondary content may be easily displayed on a device and visible to a user without distracting from the primary text. However, an audio interface must sequentially transmit information. Thus, when converting the content of a document to audio, each piece of information is transmitted in order to a listener. If secondary content is transmitted in the middle of primary text, it may distract the listener from the primary text of the document. For example, in the case of a footnote that appears in the middle of a paragraph, if the contents of the footnote are read at the location of the footnote, the listener may be distracted from a flow of the primary text. For example, inserting the word "footnote" as spoken text in the middle of primary text may be distracting. Therefore, there is a need for an audio interface capable of effectively managing secondary content so that the listener is aware of, and may interact with, the secondary content without distracting the listener from the primary text.

In order to effectively identify the existence of secondary content to a listener using an audio interface in a non-distracting fashion, a system may insert a series of non-speech audio signals corresponding to the secondary content within speech corresponding to the primary text. The audio signals may then be output as part of the audio interface to alert the listener to the presence of the secondary content. For example, at the presence of secondary content in a sentence, the device may add a brief delay in the transmission of the sentence and play a unique audio signal corresponding to the type of secondary content, for example a special beep or audible tone. The beep or tone may be of a relatively short duration (such as a second or less) so as to notify the listener of the existence of secondary content without distracting the user from the audio of the primary text. The device may then allow the user to access the secondary content, if desired. For example, if the listener wants to access the secondary content, the device may recognize a particular input, such as an input gesture, and as a result of the gesture pause output of audio corresponding to the primary text and instead output audio corresponding to the contents of the secondary content, for example reading the contents of the footnote.

In order to efficiently access and control the secondary content, the system may utilize a series of new gestures. For example, a first arc gesture may bring up the most recent secondary content. The first arc gesture may also be used to skip behind to previous secondary content. A second arc gesture opposite the first arc gesture may be used to skip ahead to subsequent secondary content. The listener may navigate back to the primary text using an exit gesture. In addition, while listening to the primary text, a third arc gesture may skip ahead to the next heading, whereas a fourth arc gesture, opposite the third arc gesture, may skip backwards to a previous heading. Other configurations of gestures for navigating secondary content may also be used. Various implementations of the above are described in detail below.

FIG. 1A illustrates a new system 100 for audibly indicating secondary content within spoken text using an electronic device 110. Audio indicators may identify the existence of the secondary content to a listener using an audio interface in a non-distracting fashion. Examples of secondary content may include originally existing item such as footnotes, endnotes, formatting such as font variations (bold, italics, underlines, etc.), highlighting or the like, and later added supplemental content such as annotations, definitions, synonyms, translations and/or other added features. In one example, as illustrated in FIG. 1A, the secondary content is the content of a footnote. Throughout this disclosure, while illustrated examples and the corresponding description may use specific language (such as "supplemental content" or "footnote"), the specific language is intended merely as a palpable example and the disclosure is not limited thereto. Thus, broader terms (in this case, "secondary content") may be substituted without departing from the disclosure.

As illustrated in FIG. 1A, the device 110 may output audio data 115 to user 10 during a text to speech process. The device 110 may include a speaker 112 configured to transmit the audio data 115, although a separate speaker, such as headphones or an external speaker connected either wired or wirelessly, may be used in addition to or in place of the speaker 112. To generate the audio data 115, the device 110 may perform text to speech processing, for example by converting text of an electronic book or document into an audio signal. As part of converting the electronic book to an audio signal, the device 110 may insert audio indicator(s) within the audio signal, where the audio indicator(s) correspond to the various item(s) of secondary content included in the electronic book.

To insert the audio indicator(s) in the audio data 115, the device 110 may obtain (120) a text segment for text to speech processing. The text segment may be any length, ranging from a single word to a full sentence or a paragraph, but for this example the text segment may be a sentence. The device 110 may identify (122) secondary content in or attached to the text segment, including identifying different types of secondary content. For example, the device 110 may identify that a text segment is associated with two footnotes and a definition for a particular word. The device 110 may mark (124) location(s) corresponding to secondary content item(s) in the text segment. For example, at the footnote(s) and/or the definition, the device 110 may mark the location corresponding to, and the type of, secondary content. For secondary content associated with or attached to the text segment but not located within the text segment, the device 110 may assign a location within the text segment to use as the location corresponding to the secondary content. The device 110 may insert (126) pauses in the text segment using Speech Synthesis Markup Language (SSML) corresponding to the location(s) of the secondary content item(s). However, some speech synthesizers may not require location(s) to be marked and/or explicit pauses inserted in the text segment, so the device 110 may omit steps 124 and/or 126 without departing from the disclosure. If step 124 is omitted, the device 110 may identify location(s) corresponding to the secondary content item(s) in the text segment during the speech synthesis described below. Similarly, if step 126 is omitted, the device 110 may insert pauses as part of the speech synthesis described below, although the device 110 may omit step 126 and not insert pauses without departing from the disclosure.

After marking the location(s) corresponding to the secondary content item(s) within the text segment, the device 110 may separately synthesize (128) speech corresponding to the text segment and determine (130) audio indicator(s) corresponding to the secondary content item(s). The device 110 may use a speech synthesizer to synthesize the speech using any methods known to one of skill in the art and further described below.

Alternatively, the device 110 may instead combine these steps and determine (130) the audio indicator(s) corresponding to the secondary content item(s) while synthesizing (128) the speech corresponding to the text segment. For example, the audio indicator(s) may be embedded in the text segment such that synthesizing the speech corresponding to the text segment includes synthesizing the audio indicator(s). As an example of the device 110 synthesizing the speech and/or the audio indicator(s), the device 110 may generate speech data and/or audio tones that are configured to be output as audio data by a speaker component, audio jack, communication equipment or any other audio output device known to one of skill in the art.

Finally, the device 110 may output (132) the audio data 115 including the synthesized speech and the audio indicator(s), where the audio indicator(s) is (are) included at location(s) corresponding to the location(s) of the secondary content item(s) within the text segment. The device 110 may track a current location in the text segment with a current moment in the synthesized speech so that the device 110 may switch between the text segment and the synthesized speech using the synchronized current location and the current moment.

Examples of an audio indicator may include a beep, an audio tone or an audio signal. In addition to marking a single location corresponding to individual item(s) of secondary content, the device 110 may mark more than one location for individual item(s) of secondary content. For example, while some secondary content item(s) have discrete location(s) like footnotes, other secondary content item(s) may, for example, format a portion of text, such as highlighting, underlining, bold font, italic font and other formatting. Thus, an audio indicator may include multiple beeps, audio tones or audio signals and may be separated by a portion of text and may be configured to be distinct so that the listener can tell the difference between one kind of audio indicator (i.e., for footnotes) and another (i.e., for highlighting). Alternatively, the beep, audio tone and/or audio signals may continue during playback of the synthesized speech corresponding to the portion of text.

Different kinds of audio indicators may be used. As an example, an audio indicator may change a voice parameter of the speech synthesizer, such as modifying a character, tone, speed or pitch of a voice output by the speech synthesizer. In addition, the audio indicator may cause the speech synthesizer to output the synthesized speech simultaneously using two or more different voices. Further, a virtual placement of the audio indicator in three-dimensional space may be different than a virtual placement of the synthesized speech and/or the audio indicator may modify a virtual placement of the voice output by the speech synthesizer. For example, the virtual placement in three-dimensional space may be based on a type of secondary content, a location of the secondary content in the text segment or the document and/or other settings based on user preferences. As an example using the type of secondary content, an audio indicator associated with a footnote may have a virtual placement on the left side of a listener (for example, through a left speaker or left headphone) whereas an audio indicator associated with a comment may have a virtual placement on the right side of a listener (for example, through a right speaker or right headphone). As an example using the location of the secondary content in the text segment, an audio indicator associated with secondary content corresponding to a location within the text segment may have a virtual placement on the left whereas an audio indicator associated with secondary content corresponding to a location at the end of the text segment may have a virtual placement on the right. As an example of modifying a virtual placement of the voice output by the speech synthesizer, an audio indicator associated with highlighted text may modify the virtual placement of portions of synthesized speech associated with the highlighted text relative to the virtual placement of the remaining synthesized speech. The disclosure is not limited thereto and the virtual placement of the voice output and/or the audio indicator may be based on one or more factors selected based on user preferences. In some examples, the audio indicator may be accompanied by haptic feedback (i.e., vibration).

The device 110 may control a verbosity of the secondary content being included in the output of the device 110. For example, the device 110 may include user preferences that control which secondary content to include and which secondary content to ignore. Alternatively, the device 110 may use an intelligent program to control the verbosity of the secondary content based on a frequency of requesting each type of secondary content. For example, the device 110 may record how often secondary content is requested and may limit the secondary content being included in the output of the device 110 based on a history of requests. The verbosity of the secondary content may be separated based on the type of secondary content or the type of text being synthesized.

Examples of applications for this disclosure include electronic devices for blind and visually impaired users, such as electronic readers, smartphones, computers and video consoles. However, the disclosure is not limited thereto and has applicability to text to speech applications for visually impaired and sighted users alike. For example, the text to speech process may be performed on an electronic device in a car, allowing the user to listen to the text of the book while driving. As another example, the text to speech process may be used with electronic text documents or websites. Other applications may include foreign language training to provide spoken examples of the foreign language text. Another application may be for users with speech impairments, such as users who use a speech generating device to interface with the world. For example, the methods disclosed above may allow a communicatively limited user to format text to add inflection to the synthesized speech. By formatting individual words, the user may carefully control an inflection of the synthesized speech.

To access secondary content, a device may be configured to recognize one or more input gestures that allow a user to navigate and control audio data associated with secondary content. For example, FIG. 1B illustrates a new gesture 140 for navigating secondary content 165 for users 10 operating an electronic device 110. As illustrated in FIG. 1B, the electronic device 110 may include a touchscreen 114 configured to detect contact and display primary content 160 and secondary content 165. The device 110 may generate audio data 115 that includes synthesized speech corresponding to a text segment of the primary content 160 and audio indicator(s) corresponding to item(s) of the secondary content 165. To navigate between item(s) of the secondary content 165, the user 10 may contact the touchscreen 114, for example with a hand 145, and the device 110 may interpret the contact as a gesture 140. The gesture 140 may be used to request additional information associated with the secondary content item(s) indicated by the audio indicator(s). For example, after an audio indicator alerts the user 10 of the existence of a secondary content item, such as a footnote, the user 10 may perform the gesture 140 to request that the device 110 provide the additional information associated with the secondary content item, for example by delivering audio associated with the footnote.

To determine if the gesture 140 is present, the device 110 may detect (150) contact to the touchscreen 114. The device 110 may then interpret (152) the contact as an arc gesture by analyzing the contact and determining if the contact begins at a first point and travels to a second point along an arc. For example, the device 110 may detect that the hand 145 initiates contact with the touchscreen 114 at the first point and travels along both a horizontal axis of the device 110 and a vertical axis of the device 110 to the second point, at which point the device 110 no longer detects contact between the hand 145 and the touchscreen 114. To interpret the contact as the gesture 140, the device 110 may determine that a difference between a first horizontal coordinate associated with the first point and a second horizontal coordinate associated with the second point exceeds a horizontal threshold. Similarly, to interpret the contact as the gesture 140, the device 110 may determine that a difference between a first vertical coordinate associated with the first point and a second vertical coordinate associated with a midpoint between the first point and the second point exceeds a vertical threshold. Interpreting the contact as the gesture 140, along with determining the midpoint and the horizontal and vertical thresholds is described in greater detail below with regard to FIGS. 3A-3D.

If the device 110 determines that the contact corresponds to the preconfigured gesture 140, the device 110 may identify (154) recent secondary content item(s) that correspond to the audio indicator(s) preceding the gesture 140. For example, the device 110 may determine the most recent audio indicator and identify a location of the secondary content item(s) that correspond to the most recent audio indicator. The device 110 may deliver (156) audio associated with the secondary content item(s) that correspond to the audio indicator(s), for example by performing a text to speech process on the text of the secondary content item(s) and outputting the synthesized speech as audio.

When synthesizing audio associated with the secondary content, voice parameters of the speech synthesizer for the secondary content may be different than the voice parameters of the speech synthesizer for the primary content. For example, the voice parameters may modify a character, tone, speed or pitch of a voice output by the speech synthesizer. Further, the voice parameters of the speech synthesizer for the secondary content may modify a virtual placement of the voice output by the speech synthesizer in three-dimensional space (for example, synthesizing or outputting audio to simulate a speaker to the listener's left or right).

Figure 1C:
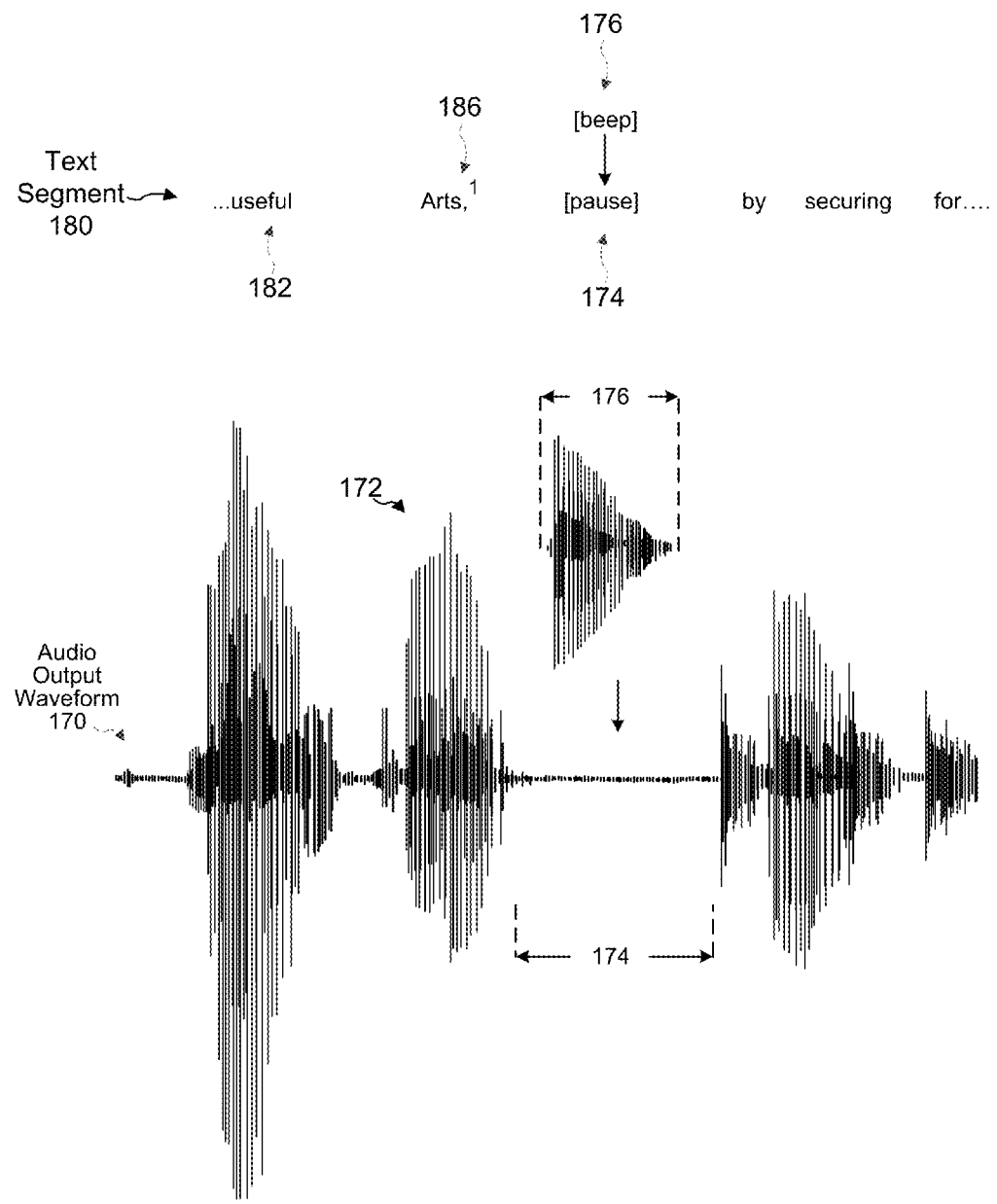
FIG. 1C illustrates an example of an audio data waveform and text associated with the audio data waveform.

FIG. 1C illustrates an example of an audio data waveform 170 and a text segment 180 associated with the audio data waveform 170. The text segment 180 may include primary text 182 and an indicator associated with secondary content 186 (e.g., footnote 1) (e.g. " . . . useful Arts % by securing for . . . "). The indicator itself may also be considered secondary content. As illustrated in FIG. 1C, the device 110 may generate primary audio signal(s) 172 based on the primary text 182 and may insert pause(s) 174 in the primary audio signal(s) 172 based on a location within the primary text 182 corresponding to the secondary content 186. As discussed above, for secondary content 186 associated with or attached to the text segment 180 but not located within the primary text 182, the device 110 may also assign a location within the primary text 182 as the location corresponding to the secondary content 186.

The device 110 may insert secondary content audio signal(s) 176 in the pause(s) 174 inserted in the primary audio signal(s) 172. The pause(s) 174 may be a fixed length used for other instances of secondary content of the same type as secondary content 186 (e.g., footnotes), may be of variable length based on a type of secondary content 186 or may be based on a length of the secondary content audio signal(s) 176 associated with the individual instances of secondary content 186. Thus, the secondary content audio signal(s) 176 may provide an audio notification of the presence of the secondary content 186 within the text segment 180. For example, the secondary content audio signal(s) 176 may alert a user to the presence of the secondary content 186 without interrupting the primary audio signal(s) 172 to output text associated with the secondary content 186.

Figure 2B:
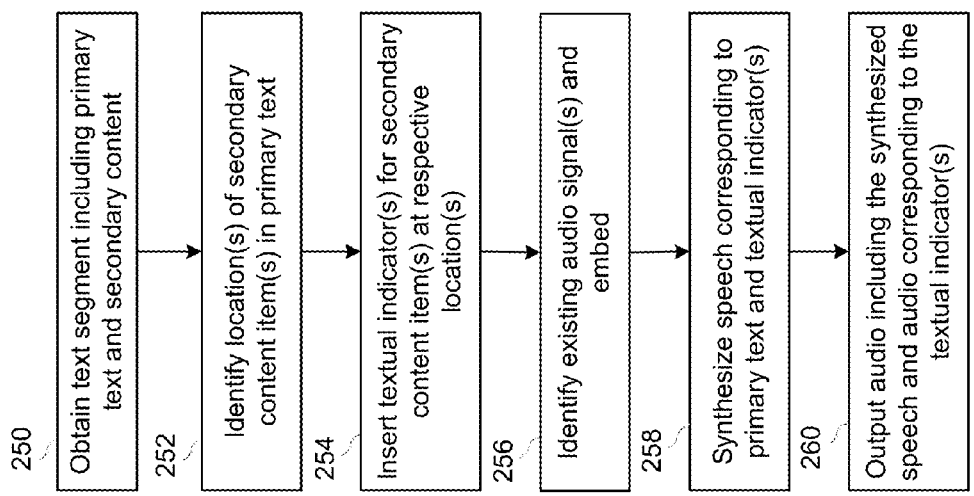
FIG. 2B illustrates an example of a method for audibly indicating secondary content.
Figure 2A:
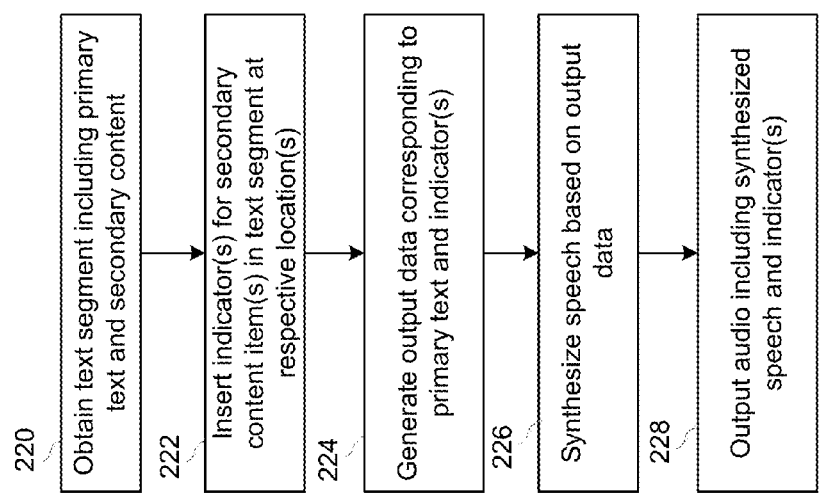
FIG. 2A illustrates an example of a method for audibly indicating the presence of secondary content.

FIG. 2A illustrates an example of a method for audibly indicating the presence of secondary content by a system 100. The primary information may include images and/or text along with secondary content associated with the images and/or text. The system 100 may convert the images and/or text to text segments and may associate the secondary content with the corresponding text segments. As illustrated in FIG. 2A, the system 100 may obtain (220) a text segment that includes primary text and secondary content associated with the text segment. If secondary content is associated with or attached to the text segment but not located within the primary text, the system 100 may assign a location within the primary text as corresponding to the secondary content. The system 100 may insert (222) indicator(s) for secondary content item(s) in the text segment based on respective location(s) of the secondary content item(s) in the text segment, wherein the indicator(s) is (are) configured to be processed during text to speech processing to enable an audible sound in audio data. For example, the system 100 may insert the indicator(s) at the respective location(s) of the secondary content item(s) in the text segment, or the system 100 may insert the indicator(s) at approximate location(s) based on punctuation or other factors. In some examples, the secondary content may already include indicator(s) associated with the secondary content. If the secondary content already includes indicator(s), the system 100 may modify the existing indicator(s) to enable the system 100 to audibly indicate the presence of secondary content during output of the audio data. Alternatively, the system 100 may be enabled to audibly indicate the presence of the secondary content based on the existing indicator(s) without modification of the indicator(s), so step 222 may be omitted. For example, documents created using a first platform or application may include the indicator(s) and the system 100 may therefore omit step 222, whereas documents created using a second platform or application may not include the indicator(s) and the system 100 may include step 222 to insert the indicator(s).

The indicator(s) may indicate audio information to be synthesized by the system 100 or the indicator(s) may reference an audio signal to be output by the system 100. The system 100 may generate (224) output data corresponding to the primary text and the indicator(s). The system 100 may synthesize (226) speech based on the output data. As an example of the system 100 synthesizing the speech and/or the indicator(s), the system 100 may generate speech data and/or audio tones that are configured to be output as audio data by a speaker component, audio jack, communication equipment or any other audio output device known to one of skill in the art.

The device 110 may track a current location in the primary text with a current moment in the synthesized speech so that the device 110 may switch between the primary text and the synthesized speech using the synchronized current location and the current moment. The system 100 may insert pause(s) in the synthesized speech corresponding to respective location(s) of the secondary content item(s) in the text segment. For example, the system 100 may explicitly insert pause(s) in the text segment while inserting (222) the indicator(s), or the system 100 may insert pause(s) in the synthesized speech during the synthesizing (226) based on the indicator(s). The system 100 may output (228) audio including the synthesized speech and the indicator(s). For example, the system 100 may output the audio using a text to speech engine for both the synthesized speech and the indicator(s) or the system 100 may output the audio by mixing the indicator(s) with the synthesized speech using an audio mixer.

The system 100 may include a local device configured to perform text to speech processing and/or synthesis and to output audio data including the synthesized speech. Alternatively, the system 100 may include a remote device configured to perform text to speech processing and/or synthesis and to transmit the generated output data to a local device for audio playback. Thus, the steps illustrated in FIG. 2A may be split and/or shared between a local device and a remote device. For example, the remote device may perform some or all of the speech synthesizing and the local device may perform the remaining speech synthesizing and/or output audio signals. In one example, the remote device may perform steps 220, 222 and 224 and transmit the generated output data to the local device, while the local device may synthesize (226) speech based on the output data and may output (228) audio including the synthesized speech and the indicators(s).

The system 100 may use a speech synthesizer to synthesize the speech using any methods known to one of skill in the art. Examples of indicator(s) may include a beep, an audio tone or an audio signal. In addition, indicator(s) may change a voice parameter of the speech synthesizer, such as modifying a character, tone, speed or pitch of a voice output by the speech synthesizer. Further, a virtual placement of the indicator(s) in three-dimensional space may be different than a virtual placement of the synthesized speech and/or the indicator(s) may modify a virtual placement of the voice output by the speech synthesizer. For example, the virtual placement in three-dimensional space may be based on a type of secondary content item(s), a location of the secondary content item(s) in the text segment or the document and/or other settings based on user preferences. As an example using the type of secondary content item(s), indicator(s) associated with a footnote may have a virtual placement on the left whereas indicator(s) associated with a comment may have a virtual placement on the right. As an example using the location of the secondary content item(s) in the text segment, indicator(s) associated with secondary content item(s) located within the text segment may have a virtual placement on the left whereas indicator(s) associated with secondary content item(s) located at the end of the text segment may have a virtual placement on the right. As an example of modifying a virtual placement of the voice output by the speech synthesizer, indicator(s) associated with highlighted text may modify the virtual placement of portions of synthesized speech associated with the highlighted text relative to the virtual placement of the remaining synthesized speech. The disclosure is not limited thereto and the virtual placement of the voice output and/or the indicator(s) may be based on one or more factors selected based on user preferences.

FIG. 2B illustrates an example of a method for audibly indicating secondary content by a system 100. The primary information may include images and/or text along with secondary content associated with the images and/or text. The system 100 may convert the images and/or text to text segments and may associate the secondary content with the corresponding text segments. As illustrated in FIG. 2B, the system 100 may obtain (250) a text segment including primary text and secondary content associated with the text segment. If secondary content is associated with or attached to the text segment but not located within the primary text, the system 100 may assign a location within the primary text for the secondary content. The system 100 may identify (252) location(s) of secondary content item(s) in the primary text. The system 100 may insert (254) textual indicator(s) for secondary content item(s) at respective location(s), the textual indicator(s) formatted according to a markup language used to annotate texts for speech synthesis. Examples of markup languages may include speech synthesis markup language (SSML), embedded audio commands or other text to speech languages. As part of or in addition to the textual indicator(s), the system 100 may insert explicit delays for the speech synthesis. In some examples, the secondary content item(s) may already include textual indicator(s) associated with the secondary content item(s). If the secondary content item(s) already include textual indicator(s), the system 100 may modify the existing textual indicator(s) to enable the system 100 to audibly indicate the presence of the secondary content item(s) during output of the audio data. Alternatively, the system 100 may be enabled to audibly indicate the presence of the secondary content item(s) based on the existing textual indicator(s) without modification of the textual indicator(s), so step 254 may be omitted. For example, documents created using a first platform or application may include the textual indicator(s) and the system 100 may therefore omit step 254, whereas documents created using a second platform or application may not include the textual indicator(s) and the system 100 may include step 254 to insert the textual indicator(s).

To provide a detailed example, primary information may include images, text and/or other media. In some examples using an electronic device, the primary information may include multiple data files. For example, the primary information may include a media file and one or more side files associated with the media file, such as a document, ebook, etc. The one or more side files may be used for metadata associated with the media file, navigational information associated with the media file, primary text, supplemental content and/or other secondary content. For example, the one or more side files may be used to include information that was not known at the time of original publication or that may be updated regularly. This may allow the electronic device to update the media file by modifying and/or replacing the one or more side files without modifying and/or replacing the media file.

The secondary content may be included in the media file and/or the one or more side files. As discussed above with regard to step 254, the secondary content item(s) may already include textual indicator(s) associated with the secondary content item(s). For example, the textual indicator(s) may associate the secondary content item(s) with metadata, navigational information or other information stored in the one or more side files. Thus, the textual indicator(s) may include the location(s) of secondary content item(s). The system 100 may identify the location(s) in step 252 using the textual indicator(s) and may therefore be enabled to audibly indicate the presence of the secondary content item(s) based on the existing textual indicator(s) without performing step 254 to insert or modify the textual indicator(s).

The system 100 may determine that existing audio signal(s) correspond to the textual indicator(s). Examples of existing audio signals may include .wav files or other audio data already stored on the system 100. For example, an existing audio signal may be a special tone configured to indicate a footnote to a listener. If existing audio signal(s) correspond(s) to the textual indicator(s), the system 100 may identify (256) the existing audio signal(s) and embed the existing audio signal(s) or location(s) of the existing audio signal(s) in the textual indicator(s). The system 100 may synthesize (258) speech corresponding to the primary text and any textual indicator(s) that lack existing audio signal(s). As an example of the system 100 synthesizing the speech and/or the textual indicator(s), the system 100 may generate speech data and/or audio tones that are configured to be output as audio data by a speaker component, audio jack, communication equipment or any other audio output device known to one of skill in the art.

The device 110 may track a current location in the primary text with a current moment in the synthesized speech so that the device 110 may switch between the primary text and the synthesized speech using the synchronized current location and current moment. As part of this speech synthesis, the system 100 may insert delays in the speech at the location(s) of textual indicator(s). Based on the speech synthesizer, the delays may be explicitly inserted in the markup language as discussed above with regard to step 254 and/or the delays may be implicitly inserted at the location(s) of the textual indicator(s) by the speech synthesizer. The delays may be identical for textual indicator(s) or may vary based on the length of the existing audio signal or a type of secondary content. For example, a first existing audio signal may have a length of one second, so a corresponding delay may last at least 1 second. A second existing audio signal may have a length of two seconds, so a corresponding delay may last at least two seconds.

Finally, the system 100 may output (260) audio including the synthesized speech and audio corresponding to the textual indicator(s) at their respective locations in the speech based on the corresponding textual indicator's location in the primary text. For example, the system 100 may output audio including the synthesized speech, and at location(s) of secondary content item(s) or indicators within the primary text the synthesized speech may include delay(s) and the system 100 may either output the existing audio signal corresponding to the secondary content item(s) or output an audio signal corresponding to the secondary content item(s) that is generated by the speech synthesizer.

As discussed above, the system 100 may include a local device 110 configured to perform text to speech processing and/or synthesis and to output audio data including the synthesized speech. Alternatively, the system 100 may include a remote device configured to perform text to speech processing and/or synthesis and to transmit the generated output data to a local device for audio playback. Thus, the steps illustrated in FIG. 2B may be split and/or shared between a remote device and a local device. For example, the remote device may perform some or all of the speech synthesizing and the local device may perform the remaining speech synthesizing and/or output audio signals.

In a first example, the remote device may perform steps 250, 252 and 254 and transmit the primary text and textual indicator(s) to the local device. The local device may perform step 256 and output (260) the synthesized speech as audio, including all existing audio signals and synthesized textual indicator(s) at respective locations in the speech based on the corresponding textual indicator's location in the primary text.

In a second example, the remote device may perform steps 250, 252, 254, 256 and 258 and then transmit the synthesized speech and textual indicator(s) to the local device. The local device may output (260) the synthesized speech as audio, including all existing audio signals and synthesized textual indicator(s) at respective locations in the speech based on the corresponding textual indicator's location in the primary text.

In a third example, the remote device may perform steps 250, 252, 254 and 258 and then transmit the synthesized speech and textual indicator(s) to the local device. The local device may perform step 256 and output (260) the synthesized speech as audio, including all existing audio signals and synthesized textual indicator(s) at respective locations in the speech based on the corresponding textual indicator's location in the primary text. Other examples are also possible.

FIGS. 3A-3D illustrate a new gesture being used in four different configurations. While the method of detecting and interpreting the gesture is similar between FIGS. 3A-3D, the device 110 may differentiate between each of the four different configurations based on a location of each of a first point, a second point and a midpoint between the first point and the second point. Each configuration illustrated in FIGS. 3A-3D may be mapped to a different result. For example, each configuration may be mapped or assigned to a different input or button in an operating system on the device 110.

To detect the gesture, the device 110 may use any point between the first point and the second point as the midpoint. Alternatively, the device 110 may compare vertical coordinates between the first point and the second point to a first vertical coordinate of the first point and determine a local maximum or local minimum having the greatest absolute vertical distance from the first point to use as the midpoint.

Figure 3B:
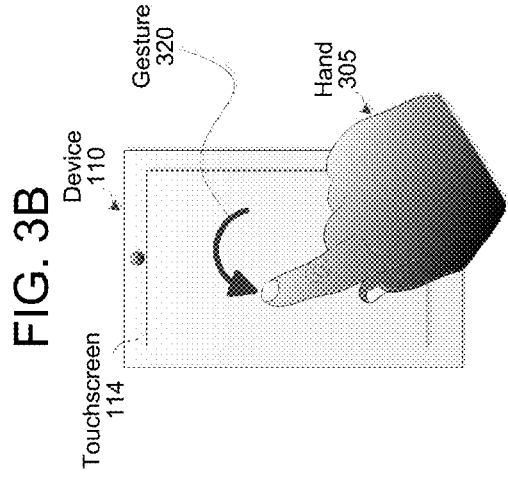
FIGS. 3A-3D illustrates a gesture being used in four different configurations.
Figure 3D:
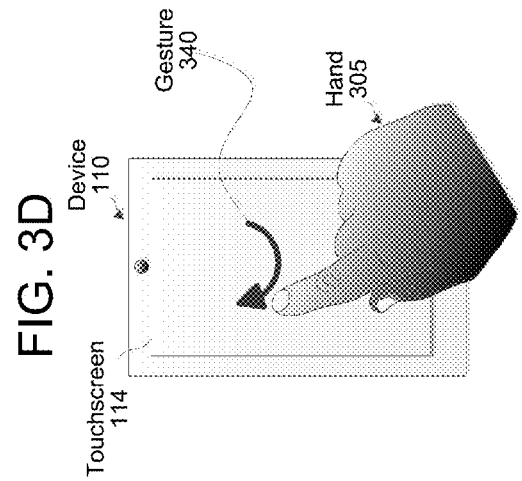
Figure 3A:
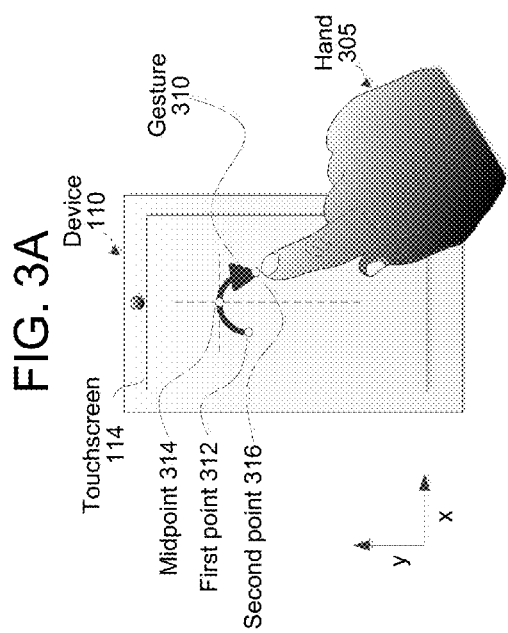

FIG. 3A illustrates a gesture 310 having a first configuration. As illustrated in FIG. 3A, the gesture 310 may move left to right in a positive vertical arcing motion. For example, the device 110 may detect that a hand 305 initiates contact with a touchscreen 114 of the device 110 at a first point 312 on the left side of the touchscreen 114. The device 110 may detect that the hand 305 continues to contact the touchscreen 114 while moving in a positive vertical arcing motion from the first point 312 to a second point 316 on the right side of the touchscreen 114, at which point the device 110 does not detect further contact between the hand 305 and the touchscreen 114. While a horizontal coordinate of the second point 316 may be substantially similar to a horizontal coordinate of the first point 312, the disclosure is not limited thereto and the horizontal coordinate of the second point 316 may be different than the horizontal coordinate of the first point 312 so long as the contact travels more than a horizontal threshold in the horizontal direction and a vertical threshold in the vertical direction.

To interpret the contact as the gesture 310, the device 110 may first determine an appropriate midpoint between the first point 312 and the second point 316. By comparing vertical coordinates between the first point 312 and the second point 316 to a first vertical coordinate of the first point 312, the device 110 may locate a local maximum at the top middle of the touchscreen 114 and use this as the midpoint 314.

The device 110 may interpret the contact as the gesture 310 if a difference between a first horizontal coordinate associated with the first point 312 and a second horizontal coordinate associated with the second point 316 exceeds a horizontal threshold, and a difference between the first vertical coordinate associated with the first point 312 and a second vertical coordinate associated with the midpoint 314 exceeds a vertical threshold. The thresholds may be an absolute value, a relative value or a desired ratio between the vertical distance and the horizontal distance. As a first example, an absolute value may be a desired distance in either the vertical and the horizontal direction, such as one inch (or a certain number of pixels across the touchscreen 114). Thus, the device 110 may interpret the contact as the gesture 310 if the horizontal distance between the second point 316 and the first point 312 is greater than one inch and the vertical distance between the midpoint 314 and the first point 312 is greater than one inch. However, the absolute value may be controlled by the device 110 and may vary between the horizontal threshold and the vertical threshold. As a second example, a relative value may be a desired ratio between the vertical distance and the horizontal distance of greater than 1:4. Thus, the device 110 may interpret the contact as the gesture 310 if the vertical distance between the midpoint 314 and the first point 312 is greater than 25% of the horizontal distance between the second point 316 and the first point 312. The relative value or desired ratio may be controlled by the device 110 and may be based on user preferences. In addition, the vertical threshold may be a relative value while the horizontal threshold may be an absolute value, or vice versa.

After determining that the contact exceeds the horizontal and vertical thresholds, the device 110 may determine the configuration of the gesture 310. For example, the device 110 may determine that the contact traveled in a left to right motion by comparing the horizontal coordinates of the first point 312 and the second point 316. For example, the second point 316 is to the right of the first point 312 on an x axis of the touchscreen 114, so the second horizontal coordinate is greater than the first horizontal coordinate and the difference between the first horizontal coordinate and the second horizontal coordinate is in the positive x direction. Thus, the device 110 may interpret the contact as a left to right motion. Similarly, the device 110 may use the vertical coordinates of the first point 312 and the midpoint 314 to determine if the contact was in a positive vertical direction or a negative vertical direction. For example, the second vertical coordinate is greater than the first vertical coordinate on a y axis of the touchscreen 114, as the midpoint 314 is above the first point 312, so the device 110 may determine that the vertical difference between the first vertical coordinate and the second vertical coordinate is in the positive y direction. Thus, the device 110 may interpret the contact as a left to right arc motion in the positive vertical direction, which is the first configuration of the gesture 310.

FIG. 3B illustrates a gesture 320 having a second configuration. As illustrated in FIG. 3B, the gesture 320 may move right to left in a positive vertical arcing motion. For example, the device 110 may detect that a hand 305 initiates contact with a touchscreen 114 of the device 110 at a first point on the right side of the touchscreen 114. The device 110 may detect that the hand 305 continues to contact the touchscreen 114 while moving in a positive vertical arcing motion from the first point to a second point on the left side of the touchscreen 114, at which point the device 110 does not detect further contact between the hand 305 and the touchscreen 114. While a horizontal coordinate of the second point may be substantially similar to a horizontal coordinate of the first point, the disclosure is not limited thereto and the horizontal coordinate of the second point may be different than the horizontal coordinate of the first point so long as the contact travels more than a horizontal threshold in the horizontal direction and a vertical threshold in the vertical direction.

To interpret the contact as the gesture 320, the device 110 may first determine an appropriate midpoint between the first point and the second point. By comparing vertical coordinates between the first point and the second point to a first vertical coordinate of the first point, the device 110 may locate a local maximum at the top middle of the touchscreen 114 and use this as the midpoint.

The device 110 may interpret the contact as the gesture 320 if a difference between a first horizontal coordinate associated with the first point and a second horizontal coordinate associated with the second point exceeds a horizontal threshold, and a difference between the first vertical coordinate associated with the first point and a second vertical coordinate associated with the midpoint exceeds a vertical threshold. As discussed in greater detail with regard to FIG. 3A, the thresholds may be an absolute value or a relative value or desired ratio between the vertical distance and the horizontal distance.

After determining that the contact exceeds the horizontal and vertical thresholds, the device 110 may determine the configuration of the gesture 320. For example, the device 110 may determine that the contact traveled in a right to left motion by comparing the horizontal coordinates of the first point and the second point. As the second point is to the left of the first point on the x axis of the touchscreen 114, the second horizontal coordinate is less than the first horizontal coordinate and the difference between the first horizontal coordinate and the second horizontal coordinate is in the negative x direction. Thus, the device 110 may interpret the contact as a right to left motion. Similarly, the device 110 may use the vertical coordinates of the first point and the midpoint to determine if the contact was in a positive vertical direction or a negative vertical direction. For example, the second vertical coordinate is greater than the first vertical coordinate on the y axis of the touchscreen 114, as the midpoint is above the first point, so the device 110 may determine that the vertical difference between the first vertical coordinate and the second vertical coordinate is in the positive y direction. Thus, the device 110 may interpret the contact as a right to left arc motion in the positive vertical direction, which is the second configuration of the gesture 320.

Figure 3C:
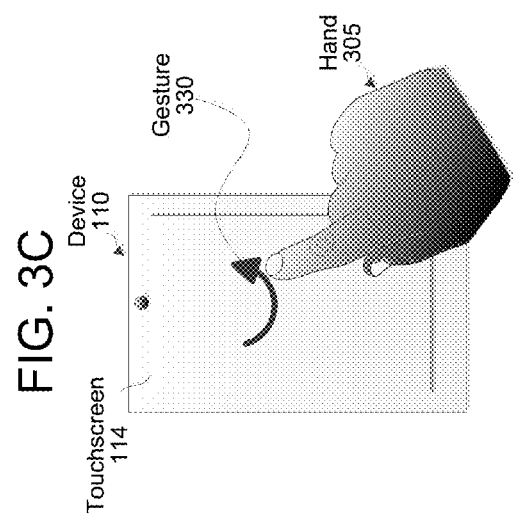

FIG. 3C illustrates a gesture 330 having a third configuration. As illustrated in FIG. 3C, the gesture 330 may move left to right in a negative vertical arcing motion. For example, the device 110 may detect that a hand 305 initiates contact with a touchscreen 114 of the device 110 at a first point on the left side of the touchscreen 114. The device 110 may detect that the hand 305 continues to contact the touchscreen 114 while moving in a negative vertical arcing motion from the first point to a second point on the right side of the touchscreen 114, at which point the device 110 does not detect further contact between the hand 305 and the touchscreen 114. While a horizontal coordinate of the second point may be substantially similar to a horizontal coordinate of the first point, the disclosure is not limited thereto and the horizontal coordinate of the second point may be different than the horizontal coordinate of the first point so long as the contact travels more than a horizontal threshold in the horizontal direction and a vertical threshold in the vertical direction.

To interpret the contact as the gesture 330, the device 110 may first determine an appropriate midpoint between the first point and the second point. By comparing vertical coordinates between the first point and the second point to a first vertical coordinate of the first point, the device 110 may locate a local minimum at the bottom middle of the touchscreen 114 and use this as the midpoint.

The device 110 may interpret the contact as the gesture 330 if a difference between a first horizontal coordinate associated with the first point and a second horizontal coordinate associated with the second point exceeds a horizontal threshold, and a difference between the first vertical coordinate associated with the first point and a second vertical coordinate associated with the midpoint exceeds a vertical threshold. As discussed in greater detail with regard to FIG. 3A, the thresholds may be an absolute value or a relative value or desired ratio between the vertical distance and the horizontal distance.

After determining that the contact exceeds the horizontal and vertical thresholds, the device 110 may determine the configuration of the gesture 330. For example, the device 110 may determine that the contact traveled in a left to right motion by comparing the horizontal coordinates of the first point and the second point. For example, the second point is to the right of the first point on the x axis of the touchscreen 114, so the second horizontal coordinate is greater than the first horizontal coordinate and the difference between the first horizontal coordinate and the second horizontal coordinate is in the positive x direction. Thus, the device 110 may interpret the contact as a left to right motion. Similarly, the device 110 may use the vertical coordinates of the first point and the midpoint to determine if the contact was in a positive vertical direction or a negative vertical direction. For example, the second vertical coordinate is less than the first vertical coordinate on the y axis of the touchscreen 114, as the midpoint is below the first point, so the device 110 may determine that the vertical difference between the first vertical coordinate and the second vertical coordinate is in the negative y direction. Thus, the device 110 may interpret the contact as a left to right arc motion in the negative vertical direction, which is the third configuration of the gesture 330.

FIG. 3D illustrates a gesture 340 having in a fourth configuration. As illustrated in FIG. 3D, the gesture 340 may move right to left in a negative vertical arcing motion. For example, the device 110 may detect that a hand 305 initiates contact with a touchscreen 114 of the device 110 at a first point on the right side of the touchscreen 114. The device 110 may detect that the hand 305 continues to contact the touchscreen 114 while moving in a negative vertical arcing motion from the first point to a second point on the left side of the touchscreen 114, at which point the device 110 does not detect further contact between the hand 305 and the touchscreen 114. While a horizontal coordinate of the second point may be substantially similar to a horizontal coordinate of the first point, the disclosure is not limited thereto and the horizontal coordinate of the second point may be different than the horizontal coordinate of the first point so long as the contact travels more than a horizontal threshold in the horizontal direction and a vertical threshold in the vertical direction.

To interpret the contact as the gesture 340, the device 110 may first determine an appropriate midpoint between the first point and the second point. By comparing vertical coordinates between the first point and the second point to a first vertical coordinate of the first point, the device 110 may locate a local minimum at the bottom middle of the touchscreen 114 and use this as the midpoint.

The device 110 may interpret the contact as the gesture 340 if a difference between a first horizontal coordinate associated with the first point and a second horizontal coordinate associated with the second point exceeds a horizontal threshold, and a difference between the first vertical coordinate associated with the first point and a second vertical coordinate associated with the midpoint exceeds a vertical threshold. As discussed in greater detail with regard to FIG. 3A, the thresholds may be an absolute value or a relative value or desired ratio between the vertical distance and the horizontal distance.

After determining that the contact exceeds the horizontal and vertical thresholds, the device 110 may determine the configuration of the gesture 340. For example, the device 110 may determine that the contact traveled in a right to left motion by comparing the horizontal coordinates of the first point and the second point. For example, the second point is to the left of the first point on the x axis of the touchscreen 114, so the second horizontal coordinate is less than the first horizontal coordinate and the difference between the first horizontal coordinate and the second horizontal coordinate is in the negative x direction. Thus, the device 110 may interpret the contact as a right to left motion. Similarly, the device 110 may use the vertical coordinates of the first point and the midpoint to determine if the contact was in a positive vertical direction or a negative vertical direction. For example, the second vertical coordinate is less than the first vertical coordinate on the y axis of the touchscreen 114, as the midpoint is below the first point, so the device 110 may determine that the vertical difference between the first vertical coordinate and the second vertical coordinate is in the negative y direction. Thus, the device 110 may interpret the contact as a right to left arc motion in the negative vertical direction, which is the fourth configuration of the gesture 340.

While the gestures illustrated in FIGS. 3A-3D have a left to right or right to left configuration, the disclosure is not limited thereto. For example, gestures may have a top to bottom or bottom to top configuration with the first point at the top of the screen and the second point at the bottom of the screen or vice versa. The same steps may apply to both left to right and top to bottom configurations by rotating individual steps by 90°. For example, instead of determining a midpoint based on a maximum or minimum vertical coordinate, the device 110 may determine a midpoint based on a maximum or minimum horizontal coordinate. Similarly, the vertical threshold may be determined by a difference between a first vertical coordinate associated with the first point and a second vertical coordinate associated with the second point, whereas the horizontal threshold may be determined by a difference between the first horizontal coordinate associated with the first point and a second horizontal coordinate associated with the midpoint.

While FIGS. 3A-3D illustrate the contact traveling roughly 120°, the device 110 may interpret contact as an arc gesture if the contact travels anywhere from about 90° to about 270°, without departing from the present disclosure. For example, if the device 110 is oriented so that a top of the device 110 is considered North (0°), the first point for the first configuration may be West (270°) and the second point may be East (90°), for an arc of 180°. Alternatively, the first point may be Northwest (315°) and the second point may be Northeast (45°), for an arc of 90°.

While the gestures illustrated above in FIGS. 3A-3D are based on contact with a touchscreen, other inputs may be used. For example, a camera may detect a subject and the device 110 may interpret movement of the subject as corresponding to one of the arc gestures as discussed above with regard to FIGS. 3A-3D. Examples of a subject may include a hand of a user, a controller or any device capable of being moved in a gesture and detected by the camera. Thus, a user may wave a hand in an arc motion and the device 110 may track the hand and interpret the arc motion as one of the arc gestures discussed above with regard to FIGS. 3A-3D. For example, the user may begin the arc motion in a top middle location and wave the hand in a clockwise direction ending in a bottom middle location. Similarly, a user may wave a controller and the device 110 may track the controller using a discernible feature or mechanism included in the controller. The device 110 may interpret a motion of the controller as one of the arc gestures discussed above with regard to FIGS. 3A-3D. For example, the user may begin motion at a right middle location and wave the controller in a counter-clockwise direction ending in a left middle location.

Examples of applications for the gestures illustrated in FIGS. 3A-3D may include navigating secondary content, menu items, structure or other content. For example, the first configuration and second configuration in the positive vertical direction may be used to navigate between structure of a document or different menu items. The first configuration illustrated in FIG. 3A may be used to navigate ahead to a subsequent menu item, block of content or header/heading/sub-heading, while the second configuration illustrated in FIG. 3B may be used to navigate back to a previous menu item, block of content or header/heading/sub-heading. The second configuration may also be used to navigate to the most recent menu item, block of content or header/heading/sub-heading. Similarly, the third configuration and fourth configuration in the negative vertical direction may be used to navigate between secondary content. The third configuration illustrated in FIG. 3C may be used to navigate ahead to subsequent secondary content, while the fourth configuration illustrated in FIG. 3D may be used to navigate back to previous secondary content. The fourth configuration may also be used to navigate to the most recent secondary content in response to an audio indicator. As an alternative, the third configuration and fourth configuration may be used to navigate between all types of secondary content, while the first configuration and the second configuration may be used to navigate between selected types of secondary content. The selected types of secondary content may be based on user preferences and may be limited, as one example, to only footnotes and/or comments to facilitate convenient navigation.

Figure 4A:
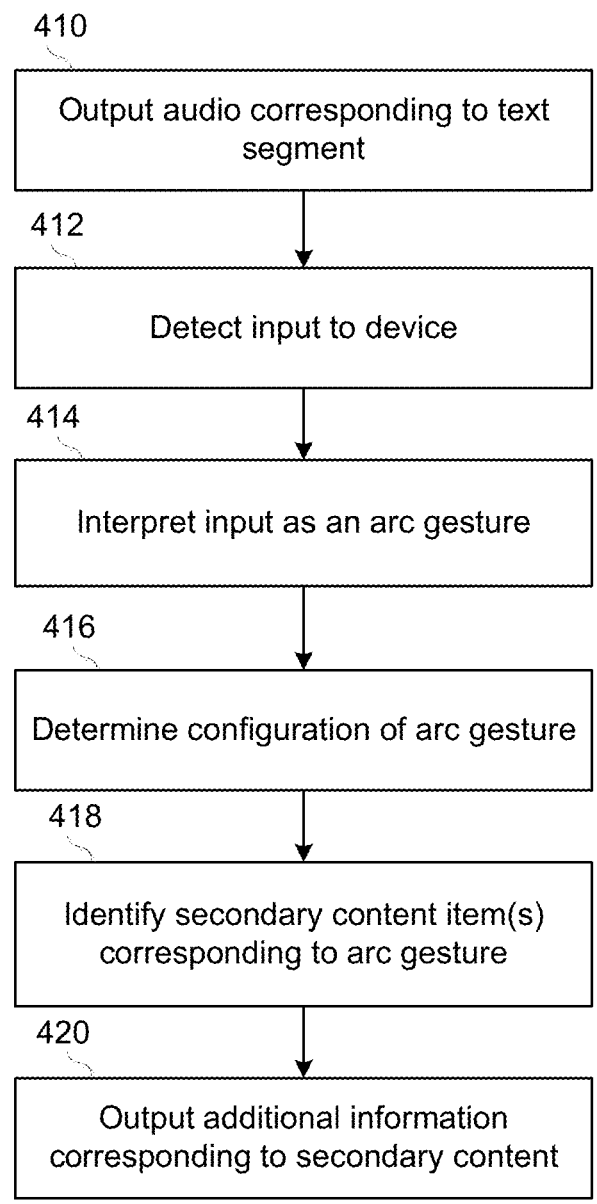
FIG. 4A illustrates a flowchart of a method for navigating secondary content using gestures.

FIG. 4A illustrates an example of a simplified flowchart for navigating secondary content using gestures. As illustrated in FIG. 4A, the device 110 may output (410) audio corresponding to a text segment, the text segment including primary text and secondary content associated with the text segment. The audio may include first speech corresponding to the primary text in the text segment and audio indicator(s) corresponding to secondary content item(s). The device 110 may track a current location in the primary text synchronized with a current moment in the first speech so that the device 110 may switch between the primary text and the first speech using the synchronized current location and the current moment. The device 110 may detect (412) input to the device. Such inputs may be detected, for example, using a touchscreen, a camera, motion sensors or other devices configured to detect gestures. The device 110 may interpret (414) the input as an arc gesture, for example if the input travels along both a horizontal axis and a vertical axis from a first point to a second point and exceeds both a vertical threshold and a horizontal threshold. In this example, a difference between a first horizontal coordinate associated with the first point and a second horizontal coordinate associated with the second point exceeding a horizontal threshold in a first direction relative to the first point, and a difference between a first vertical coordinate associated with the first point and a second vertical coordinate associated with a midpoint of the first arc gesture exceeding a vertical threshold in a second direction relative to the first point.

Based on detecting (412) the input, interpreting (414) the input as the arc gesture and/or determining (416) the configuration of the arc gesture, the device 110 may interrupt outputting (410) of the audio. For example, the device 110 may stop outputting (410) the audio once the input is detected (412) and may output an audio signal and/or haptic feedback as a notification that the device 110 interpreted (414) the input as the arc gesture and determined (416) the configuration of the arc gesture. The audio signal may be the audio indicator representing the most recent secondary content item or may be a fixed audio signal based on a type of secondary content item.

The device 110 may determine (416) a configuration of the arc gesture based on the first direction and the second direction. The device 110 may identify (418) secondary content item(s) corresponding to the arc gesture in response to the arc gesture, for example identifying the secondary content item associated with the most recent audio indicator output prior to detecting the arc gesture. Finally, the device 110 may output (420) additional information corresponding to the secondary content item(s) (such as audio associated with the secondary content item) in response to the arc gesture. As discussed above, the device 110 may output an audio signal and/or haptic feedback prior to outputting the additional information. For example, the audio signal may be the audio indicator representing the most recent secondary content item or may be a fixed audio signal based on a type of secondary content item.

If an exit gesture is detected, the device 110 may interrupt any of steps 412, 414, 416, 418 and 420 and resume outputting (410) audio corresponding to the text segment. For example, upon detecting (412) the input, the device 110 may store a current moment within the first speech as a speech location and a current location within the text segment as a text location. Alternatively, after detecting (412) the input, interpreting (414) the input as the arc gesture, determining (416) the configuration of the arc gesture and identifying (416) the secondary content corresponding to the arc gesture, the device 110 may store a moment in the first speech of the audio indicator(s) associated with the secondary content item(s) as the speech location and may store a location of the secondary content item(s) in the text segment as the text location. After detecting the exit gesture, the device 110 may resume outputting (410) audio using the stored speech location and the stored text location. As an alternative, the device 110 may resume the audio at a point prior to the stored speech location and the stored text location, based on user preferences. For example, the device 110 may resume the audio at a beginning of the text segment associated with the stored text location or may resume the audio at a fixed interval, such as five seconds, prior to the stored speech location.

FIG. 4B illustrates an example of a detailed flowchart for navigating secondary content using gestures. As illustrated in FIG. 4B, the device 110 may determine (430) first speech corresponding to primary text in a text segment, the text segment including the primary text and secondary content associated with the text segment. Concurrently or subsequently to determination of the first speech, the device 110 may determine (432) audio indicator(s) representing secondary content item(s) at respective locations in the first speech based on location(s) of secondary content item(s) in the primary text. The device 110 may then output (433) the first speech and audio indicator(s). For example, the device 110 may output audio indicator(s) during output of the first speech, during pauses corresponding to the secondary content item(s) or indicators inserted within the output of the first speech, or within a time threshold of the output of the first speech. Steps 430, 432 and 433 may correspond with any of the steps illustrated in FIGS. 2A and 2B without departing from the disclosure. As the device 110 performs steps 430, 432 and 433, the device 110 may track a current location in the primary text with a current moment in the first speech so that the device 110 may switch between the primary text and the first speech using the synchronized current location and the current moment.

The device 110 may detect (434) a first input within a time threshold of output of an audio indicator. The device 110 may detect the first input by detecting contact on a touchscreen, detecting motion of a subject using a camera, detecting motion of a subject using motion sensors, watches, accelerometers, muscle movements, electrical signal monitors or any other methods of detecting gestures known to one of skill in the art. After detecting the first input, the device 110 may interpret (436) the first input as a first arc gesture based on locations of a first point, a second point and a midpoint of the first input. One example of interpreting gestures is described in greater detail below with respect to FIG. 4C. Based on detecting (434) the first input and/or interpreting (436) the first input as a first arc gesture, the device 110 may interrupt outputting (433) of the first speech and audio indicator(s). For example, the device 110 may stop outputting (433) the first speech and audio indicator(s) once the first input is detected (434) and may output an audio signal and/or haptic feedback as a notification that the device 110 interpreted (436) the first input as the first arc gesture. The audio signal may be the audio indicator representing the most recent secondary content item or may be a fixed audio signal based on a type of secondary content item.

If the first input is interpreted as the first arc gesture, the device 110 may identify (438) a secondary content item corresponding to the first arc gesture as a current secondary content item in response to the first arc gesture. For example, the device 110 may identify a secondary content item associated with the most recent audio indicator output prior to detecting the first arc gesture as the current secondary content item.

The device 110 may identify (440) supplemental text associated with a current secondary content item, may synthesize (442) the supplemental text to create second speech and may output (444) the synthesized second speech.

As an example of the device 110 synthesizing the second speech, the device 110 may generate speech data that is configured to be output as audio data by a speaker component, audio jack, communication equipment or any other audio output device known to one of skill in the art. As discussed above, the device 110 may output an audio signal and/or haptic feedback prior to outputting the synthesized second speech. For example, the audio signal may be the audio indicator representing the most recent secondary content item or may be a fixed audio signal based on type(s) of secondary content item(s). While this example includes synthesizing the supplemental text to create the second speech, the device 110 may identify existing second speech associated with the supplemental text instead. If the audio associated with the supplemental text is generated by a speech synthesizer, voice parameters of the speech synthesizer for the supplemental text may be different than the voice parameters of the speech synthesizer for the primary text. For example, the voice parameters may modify a character, tone, speed or pitch of a voice output by the speech synthesizer.

The device 110 may modify a virtual placement of audio in three-dimensional space. For example, a virtual placement of the audio indicator(s) in three-dimensional space may be different than a virtual placement of the first speech and/or second speech, the audio indicator(s) may modify a virtual placement of the voice output by the speech synthesizer and/or a virtual placement of the second speech may be different than a virtual placement of the first speech. The virtual placement may be based on a type of secondary content item(s), a location of the secondary content item(s) in the primary text or the document and/or other settings based on user preferences. As an example using the type of secondary content item(s), audio indicator(s) associated with a footnote may have a virtual placement on the left whereas audio indicator(s) associated with a comment may have a virtual placement on the right. As an example using the location of the secondary content item(s) in the text segment, audio indicator(s) associated with secondary content item(s) or indicators located within the primary text may have a virtual placement on the left whereas audio indicator(s) associated with secondary content item(s) located at the end of the primary text may have a virtual placement on the right. As an example of modifying a virtual placement of the voice output by the speech synthesizer, audio indicator(s) associated with highlighted text may modify the virtual placement of portions of first speech and/or second speech associated with the highlighted text relative to the virtual placement of the remaining first speech and/or second speech. As an example of different virtual placements of the first speech and the second speech, first speech may have a virtual placement on the left whereas second speech may have a virtual placement on the right. The disclosure is not limited thereto and the virtual placement of the voice output and/or the audio indicator(s) may be based on one or more factors selected based on user preferences.

At any point after detecting the first input, the device 110 may detect (446) an additional input corresponding to a gesture. As discussed above, the device 110 may detect the additional input by detecting contact on a touchscreen, detecting motion of a subject using a camera, detecting motion of a subject using motion sensors, watches, accelerometers, muscle movements, electrical signal monitors or any other methods of detecting gestures known to one of skill in the art. After detecting the additional input, the device 110 may interpret (448) the additional input as an additional arc gesture based on locations of a first point, a second point and a midpoint of the additional input. One example of interpreting gestures is described in greater detail below with respect to FIG. 4C.

If the additional input is interpreted as the additional arc gesture, the device 110 may identify (450) additional secondary content item(s) corresponding to the additional arc gesture in response to the additional arc gesture. For example, the device 110 may identify an additional secondary content item or indicator located immediately before or after the current secondary content item or indicator(s) within the primary text. After identifying the additional secondary content item, the device 110 may loop (452) to step 440 and repeat steps 440, 442, 444 and/or 446 using the additional secondary content item as a current secondary content item. The device 110 may repeat steps 448 and 450 and continue to loop (452) until no additional input is detected before a time threshold is exceeded or an exit gesture is detected.

If an exit gesture is detected, the device 110 may interrupt output of the synthesized second speech and may output the first speech based on a moment of the first input in the first speech. For example, upon detecting (434) the first input, the device 110 may store a current moment within the first speech as a speech location and a current location within the text segment as a text location. Alternatively, after detecting (434) the first input, interpreting (436) the first input as the first arc gesture and identifying (438) the secondary content corresponding to the first arc gesture, the device 110 may store a moment of the audio indicator associated with the secondary content in the first speech as the speech location and may store a location of the secondary content in the text segment as the text location.

After detecting the exit gesture, the device 110 may resume playback of the first speech by performing steps 430, 432 and 433 using the stored speech location and the stored text location. As an alternative, the device 110 may resume playback of the first speech at a point prior to the stored speech location and the stored text location, based on user preferences. For example, the device 110 may begin the first speech at a beginning of the text segment associated with the stored text location or may begin the first speech at a fixed interval, such as five seconds, prior to the stored speech location.

Using the method of navigating secondary content illustrated in the flowchart of FIG. 4B, a user may hear an audio indicator corresponding to a secondary content item and request supplemental text associated with the secondary content item. The device 110 may detect the request and output audio corresponding to the supplemental text associated with the secondary content item. Using additional arc gestures, the user may navigate to next subsequent or next previous secondary content item(s) and request supplemental text associated with the next subsequent or next previous secondary content item(s). The device 110 may detect the additional arc gestures, identify the next subsequent or next previous secondary content item(s) and output audio corresponding to the supplemental text associated with the next subsequent or next previous secondary content item(s). In addition, the user may use additional arc gesture(s) to request that the second speech associated with the current secondary content item is repeated. The device 110 may detect the additional arc gesture(s) and output audio corresponding to the supplemental text associated with the current secondary content item. Once the user is finished with the supplemental text and the secondary content, the user may wait a desired amount of time or may make an exit gesture indicating to the device 110 to continue playback of the first speech corresponding to the primary text in the text segment. The desired amount of time may be defined by user preferences and may have different values based on a type of secondary content or a level of secondary content. The exit gesture indicating to the device 110 to continue playback of the first speech may also be defined by user preferences. For example, the exit gesture may be defined as two fingers swiping down or other gestures known to one of skill in the art. The device 110 may detect the exit gesture or may determine that a time period has elapsed and may output audio including the first speech as discussed above.

Figure 4C:
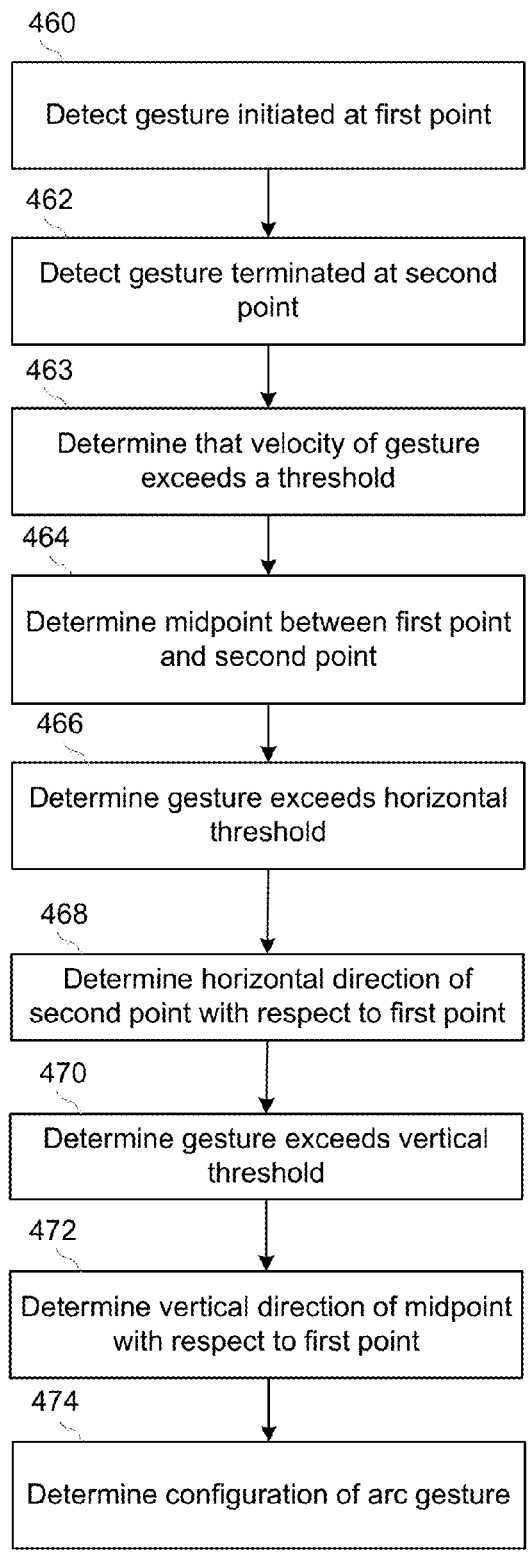
FIG. 4C illustrates a flowchart of a method for interpreting gestures as an arc gesture.

FIG. 4C illustrates an example of a detailed flowchart for interpreting an input as an arc gesture. First, the device 110 may detect (460) that an input is initiated at a first point. For example, the device 110 may detect that a hand 145 contacts a touchscreen 114 of the device 110 at a first point, such as the left side of the touchscreen. If the input device is a camera or other device that continually detects a subject, the device 110 may determine the first point based on a lack of movement of the subject during a time threshold or by other methods known to one of skill in the art. For example, the device 110 may identify a local maximum or local minimum of the input in the horizontal direction as the first point.

The device 110 may then detect (462) that the input is terminated at a second point. For example, the device 110 may detect that the hand continues to contact the touchscreen 114 while moving in a positive vertical arcing motion from the first point to a second point on the right side of the touchscreen 114, at which point the device 110 does not detect further contact between the hand and the touchscreen 114. Alternatively, if the input device is the camera or other device that continually detects the subject, the device 110 may detect that the subject moves in a positive vertical arcing motion from the first point to a second point and may determine the second point based on a lack of movement of the subject during a time threshold or by other methods known to one of skill in the art. For example, the device 110 may identify a local maximum or local minimum of the input in the horizontal direction, opposite the first point, as the second point.

The device 110 may determine (463) that a velocity of the input exceeds a threshold. For example, the input may result from inadvertent contact or be contact made without intending to be the arc gesture. These unintentional inputs may be slow-moving, having a low velocity or a long period of time between the first point and the second point. To filter unintentional inputs and reduce or prevent the device 110 from interrupting the first speech accidentally, the device 110 may determine that the velocity of the input exceeds the threshold for the input to be interpreted as the arc gesture. The device 110 may set the threshold so that any concerted movement or deliberate input may exceed the threshold.

After detecting the first point and the second point, the device 110 may determine (464) an appropriate midpoint between the first point and the second point. For example, by comparing vertical coordinates between the first point and the second point to a first vertical coordinate of the first point, the device 110 may locate a local maximum and use this as the midpoint. The midpoint may be used to determine if the input exceeds a vertical threshold to assist the device 110 in differentiating between a horizontal swipe gesture and an arc gesture. Therefore, identifying the local maximum or minimum in the vertical direction as the midpoint is beneficial to detecting if the input is an arc gesture. However, the midpoint is not limited to the local maximum or local minimum and may be any point between the first point and the second point. For example, the device 110 may determine a horizontal coordinate roughly halfway between the first point and the second point and may use the corresponding vertical coordinate as the midpoint.

The device 110 may determine (466) if the input exceeds a horizontal threshold. For example, the device 110 may calculate a difference between a first horizontal coordinate associated with the first point and a second horizontal coordinate associated with the second point and compare the difference to a desired horizontal threshold. Similarly, the device 110 may determine (468) a horizontal direction of the second point with respect to the first point. For example, the device 110 may determine that the input traveled in a left to right motion by comparing the horizontal coordinates of the first point and the second point. If the second point is to the right of the first point on an x axis of the touchscreen 114, then the second horizontal coordinate is greater than the first horizontal coordinate and the difference between the first horizontal coordinate and the second horizontal coordinate may be in the positive x direction. Thus, the device 110 may interpret the input as having a left to right motion.

The device 110 may also determine (470) if the input exceeds a vertical threshold. For example, the device 110 may calculate a difference between the first vertical coordinate associated with the first point and a second vertical coordinate associated with the midpoint and compare the difference to a desired vertical threshold. As discussed in greater detail with regard to FIG. 3A, the thresholds may be an absolute value or a relative value or desired ratio between the vertical distance and the horizontal distance. Similarly, the device 110 may determine (472) a vertical direction of the midpoint with respect to the first point. For example, the device 110 may use the vertical coordinates of the first point and the midpoint to determine if the input was in a positive vertical direction or a negative vertical direction. If the second vertical coordinate is greater than the first vertical coordinate on a y axis of the touchscreen 114, the midpoint is above the first point and the device 110 may determine that the vertical difference between the first vertical coordinate and the second vertical coordinate is in the positive y direction.

If the input exceeds the horizontal threshold and the vertical threshold, the device 110 may determine (474) a configuration of the arc gesture based on the horizontal direction of the second point with respect to the first point and the vertical direction of the midpoint with respect to the first point. Thus, the device 110 may identify if the input is an arc gesture and if the input corresponds to the first configuration illustrated in FIG. 3A, the second configuration illustrated in FIG. 3B, the third configuration illustrated in FIG. 3C or the fourth configuration illustrated in FIG. 3D.

FIG. 5A illustrates an example of a new hierarchy navigational gesture to navigate between different levels of secondary content or different menu items. For example, instead of navigating amongst secondary content items on a similar level, the hierarchy navigation gesture may be used to cycle between a lower level of secondary content and a higher level of secondary content. For example, secondary content may be organized in a hierarchy with nested secondary content providing additional information related to a particular secondary content item. As a first example, a higher level secondary content may be a footnote related to a historic event, and lower level secondary content may include several secondary content items providing additional information regarding the historic event. The gestures illustrated in FIG. 3A-3D may navigate amongst the several secondary content items, whereas the new hierarchy navigational gesture may navigate between the higher level secondary content (footnote) and the lower level secondary content (several secondary content items). As a second example, higher level secondary content may be a first type of secondary content and lower level secondary content may be a second type of secondary content. The gestures illustrated in FIG. 3A-3D may navigate amongst the higher level secondary content items or the lower level secondary content items, whereas the new hierarchy navigational gesture may navigate between the higher level secondary content (first type of secondary content) and the lower level secondary content (second type of secondary content). However, the disclosure is not limited to navigating amongst secondary content. For example, the gestures may navigate amongst menu items (including nested menu items) or electronic content (such as navigating between chapters, sections and/or paragraphs within an electronic document) without departing from the present disclosure.

As illustrated in FIG. 5A, the device 110 may interpret contact as the gesture 520 if the contact begins at an initial position and travels to a final position along a spiraling arc. For example, the hand 525 may begin at the initial position on the left side of the device 110 and travel along both a horizontal axis of the device 110 and a vertical axis of the device 110 to the final position on the right side of the device 110 after completing a full revolution. Thus, the spiraling arc may be separated into two separate motions; a circle motion followed by the arc motion described above with respect to FIGS. 3A-3D. In addition, the circle motion may be broken into two arc motions described above with respect to FIGS. 3A-3D.

As an example using a touchscreen 114, the hand 525 may create the gesture 520 by contacting the device 110 at an initial position (first point 511) and traveling in an arc motion in the positive vertical direction from the first point 511 to a second point 512. Subsequently, as part of the same motion, the hand 525 may continue from the second point 513 and travel in an arc motion in the negative vertical direction to a third point 515 located near the first point 511. Finally, as part of the same motion, the hand 525 may continue from the third point 515 and travel in the positive vertical direction to the final position (fourth point 517) located near the second point 513.

To detect the gesture 520, the device 110 detects a continuous motion from the first point 511 to the second point 513, the third point 515 and the fourth point 517. However, while the first point 511 corresponds to the initial contact between the hand 525 and the device 110 and the fourth point 517 corresponds to the final position prior to contact ending between the hand 525 and the device 110, the second point 513 and the third point 515 are midpoints that are determined by the device 110. In one example, the device 110 may determine which coordinates along the contact correspond to the second point 513 and the third point 515 by finding a local maximum and a local minimum in the horizontal direction between the first point 511 and the fourth point 517. For example, the second point 513 may have a maximum horizontal coordinate and the third point 515 may have a minimum horizontal coordinate. While FIG. 5 illustrates the first point 511, the second point 513, the third point 515 and the fourth point 517 having a substantially similar vertical coordinate, the vertical coordinate associated with each may vary without departing from the present disclosure. For example, the device 110 may detect the gesture 520 regardless of variations between each of the vertical coordinates associated with the first point 511, the second point 513, the third point 515 and the fourth point 517, provided the contact exceeds the requisite vertical thresholds.

In order to determine that the continuous motion corresponds to the gesture 520, the device 110 may split the continuous motion into three discrete segments encompassing three separate arc motions. Each of the arc motions may be determined as discussed above with regard to FIGS. 3A-3D. For example, the device 110 may detect a first arc motion between the first point 511 and the second point 513, a second arc motion between the second point 513 and the third point 515, and a third arc motion between the third point 515 and the fourth point 517.

To detect the first arc motion, the device 110 may determine a first midpoint 512 having a maximum vertical coordinate between the first point 511 and the second point 513. Similarly, to detect the second arc motion the device 110 may determine a second midpoint 514 having a minimum vertical coordinate between the second point 513 and the third point 515. Finally, to detect the third arc motion the device 110 may determine a third midpoint 516 having a maximum vertical coordinate between the third point 515 and the fourth point 517.

To detect the first arc motion, the device 110 may determine that a distance between a first horizontal coordinate associated with the first point 511 and a second horizontal coordinate associated with the second point 513 exceeds a horizontal threshold. Similarly, the device 110 may determine that a difference between a first vertical coordinate associated with the first point 511 and a second vertical coordinate associated with the first midpoint 512 exceeds a vertical threshold.

To detect the second arc motion, the device 110 may determine that a distance between the second horizontal coordinate associated with the second point 513 and a third horizontal coordinate associated with the third point 515 exceeds a horizontal threshold. Similarly, the device 110 may determine that a difference between a third vertical coordinate associated with the second point 513 and a fourth vertical coordinate associated with the second midpoint 514 exceeds a vertical threshold.

To detect the third arc motion, the device 110 may determine that a distance between the third horizontal coordinate associated with the third point 515 and a fourth horizontal coordinate associated with the fourth point 517 exceeds a horizontal threshold. Similarly, the device 110 may determine that a difference between a fifth vertical coordinate associated with the third point 515 and a sixth vertical coordinate associated with the third midpoint 516 exceeds a vertical threshold.

Each of the first arc motion, the second arc motion and the third arc motion may be detected according to the methods described above with regard to FIGS. 4A-C. In addition, the method may be applicable to location data from any input device and the disclosure is not limited to the touchscreen 114. Examples of input devices may include a touchscreen, a camera, motion sensors or other devices configured to detect gestures. Use of other input devices may require additional steps to detect the gesture 520, such as the steps concerning input devices that continually detect a subject outlined above with regard to FIGS. 4A-C.

While FIG. 5A illustrates contact traveling 540°, the device 110 may interpret contact as the gesture 520 if the contact travels anywhere from about 360° to about 720° without departing from the present disclosure. For example, the initial contact may occur at the location of the first midpoint 512 and the contact may continue to the fourth point 517 for a total of 450°. In this example, the device 110 may determine the first point 511 as the point of initial contact and may determine the first midpoint 512 as being located at a point halfway between horizontal coordinates of the first point 511 and the second point 513. Alternatively, the device 110 may rotate each of the first point 511, the first midpoint 512, the second point 513, the second midpoint 514 and the third point 515 by 90° relative to FIG. 5A and may calculate the third midpoint 516 as being located at a point halfway between horizontal coordinates of the third point 515 and the fourth point 517.

While FIG. 5A illustrates the hierarchy navigational gesture configured in a positive direction (left to right), the hierarchy navigational gesture may be configured in a negative direction (right to left) instead. Using the same steps detailed above, the device 110 may determine a first point (on the right) and a fourth point (on the left) and separate the input into a first arc motion, a second arc motion and a third arc motion. Similarly, while the hierarchy navigational gesture is illustrated in FIG. 5A as having a clockwise orientation, the hierarchy navigational gesture may have a counter-clockwise orientation. Thus, like gestures 320, 330, 340 and 350 illustrated in FIGS. 3A-3D, the hierarchy navigational gesture may be used in one of four configurations and each configuration may be mapped to a different result. For example, each configuration may be mapped or assigned to a different input or button in an operating system on the device 110.

Similarly, instead of left to right or right to left, the hierarchy navigational gesture may be configured in a top to bottom or bottom to top configuration by having the spiral begin at the top or bottom of the screen. For example, an input may begin a spiral with a first point at the top of the screen (where the third midpoint 516 is located in FIG. 5A) and a second point at the bottom of the screen (where second midpoint 514 is located in FIG. 5A) or vice versa. The same steps may apply to both left to right and top to bottom configurations by rotating individual steps by 90°. For example, instead of determining a midpoint based on a maximum or minimum vertical coordinate, the device 110 may determine a midpoint based on a maximum or minimum horizontal coordinate. Similarly, the vertical threshold may be determined by a difference between a first vertical coordinate associated with the first point and a second vertical coordinate associated with the second point, whereas the horizontal threshold may be determined by a difference between the first horizontal coordinate associated with the first point and a second horizontal coordinate associated with the midpoint.

Figure 5B:
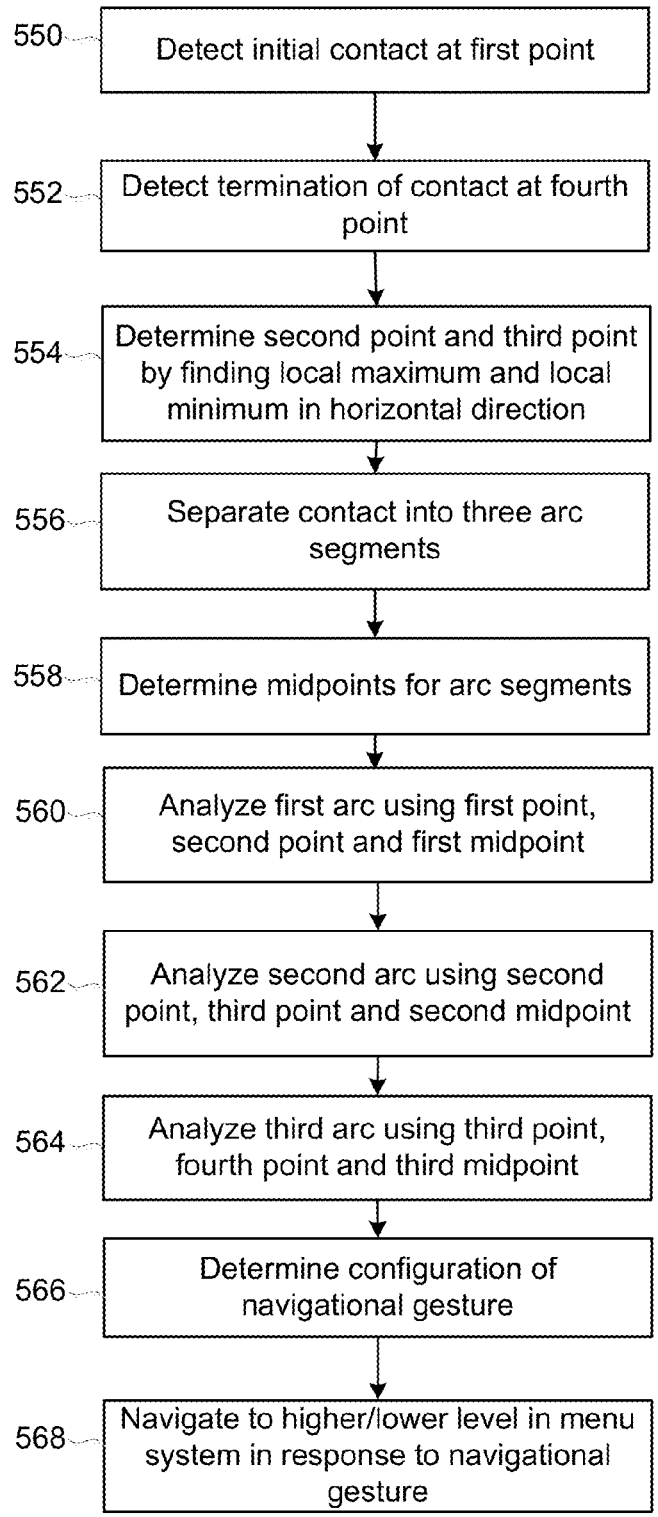
FIG. 5B illustrates a flowchart of a method for navigating between different levels of secondary content or different menu items.

FIG. 5B illustrates an example of a detailed flowchart for navigating between different levels of secondary content or different menu items. The device 110 may detect (550) initial contact at a first point 511 and detect (552) termination of contact at a fourth point 517. From the first point 511 and the fourth point 517, the device 110 may determine (554) a second point 513 and a third point 515 by finding a local maximum and a local minimum in the horizontal direction between the first point 511 and the fourth point 517. The device 110 may then separate (556) the contact into three discrete arc segments encompassing a first arc motion, a second arc motion and a third arc motion. The device 110 may determine (558) midpoints 512, 514, 516 for the first arc motion, the second arc motion and/or the third arc motion. Using the methods discussed above with regard to FIGS. 4A-C, the device 110 may analyze (560) the first arc motion using the first point 511, the second point 513 and the first midpoint 512, analyze (562) the second arc motion using the second point 513, the third point 515 and the second midpoint 514 and analyze (564) the third arc motion using the third point 515, the fourth point 517 and the third midpoint 516. The device 110 may determine (566) a configuration of the hierarchical navigational gesture by comparing the first point 511 to the fourth point 517 and the first point 511 to the first midpoint 512. If the device 110 determines that the first arc motion, the second arc motion and the third arc motion all exceed the respective horizontal and vertical thresholds, the device 110 may navigate (568) to a higher/lower level in the menu system based on the configuration of the hierarchical navigational gesture.

Figure 7:
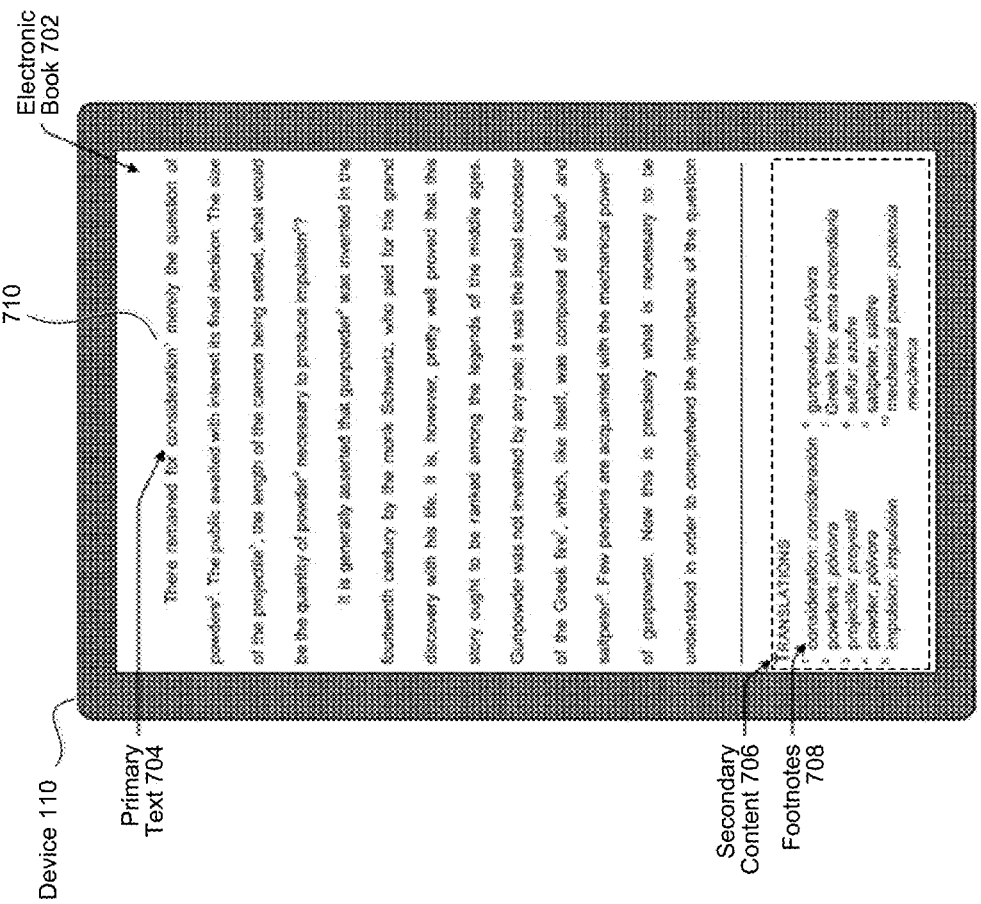
Figure 8:
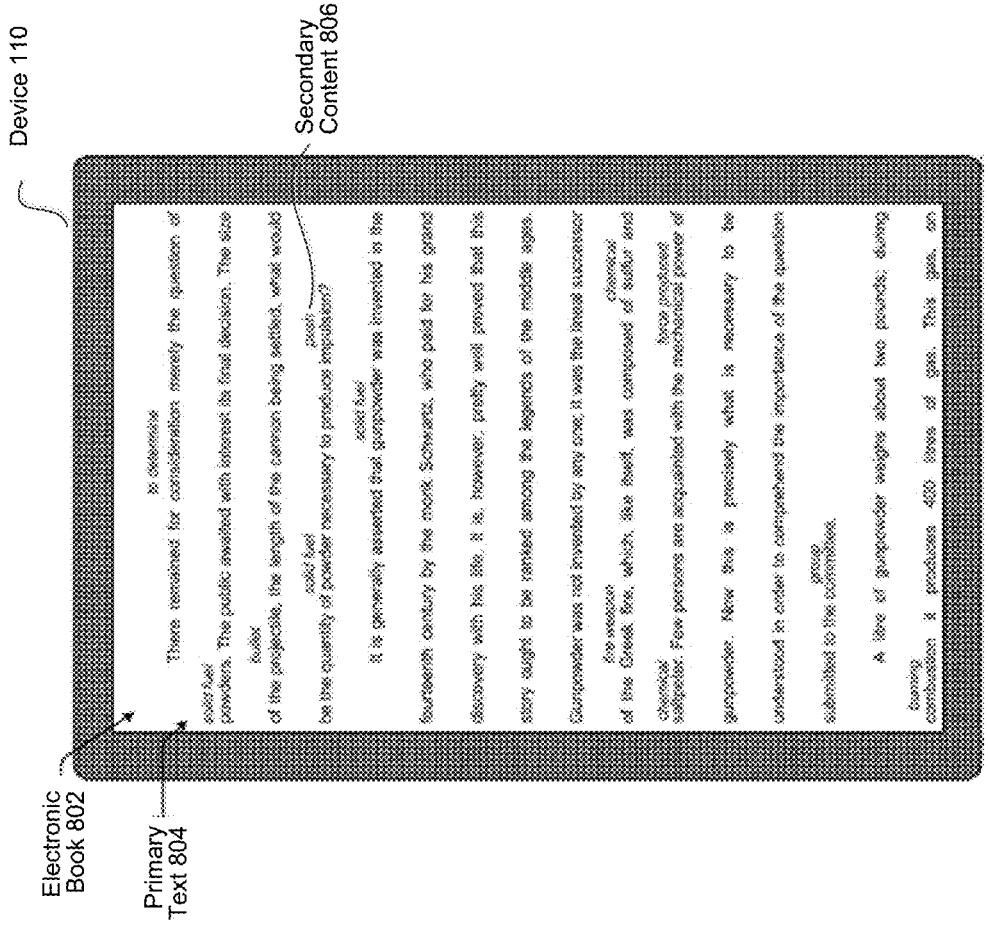

FIGS. 6-8 illustrate several types of secondary content that may be included in an electronic book displayed on an electronic device. These illustrations are provided as examples and are not intended to be comprehensive. The disclosure is intended to include all secondary content, supplemental content or other additional information that is tangential to the primary text of the electronic book.

FIG. 6 illustrates a device 110 displaying an electronic book 602 with secondary content that includes comprehension guides displayed as in line parentheticals. While this example illustrates the text of the book as being in English, the language may vary without departing from the disclosure. As illustrated in FIG. 6, the ebook 602 includes primary text 604 and secondary content 606. In this particular example, the secondary content 606 may be foreign translations of particular words within the primary text separated by parentheses. This type of secondary content may be helpful to enable non-English speaking users to understand difficult English words.

In one aspect, the secondary content may be provided as part of the document, for example, translations that are incorporated into a learning text as part of the original ebook. In another aspect, the secondary content may be created dynamically. For example the system 100/device 110 may operate an application that processes primary text and compares it to a level of a user's language understanding. For words that may be difficult for the user, the system may obtain potential translations, which are then displayed on the device as secondary content (i.e., the translation(s)) proximate to the primary text (i.e., the word(s) being translated). Other dynamic systems of creating secondary content may also be used.

In this example, when the device 110 synthesizes the primary text 604, the device 110 may insert audio indicator(s) at the location(s) of item(s) of secondary content 606 within the primary text 604. If the device 110 detects a first gesture (or other command to access the secondary content item), the device 110 may synthesize speech for the text of secondary content item 606 (which is associated with the most recent output audio indicator) and output the synthesized speech of the secondary content item.

If the device 110 detects a second gesture, the device 110 may skip to previous secondary content item(s) or subsequent secondary content item(s), depending on the direction of the second gesture. Similarly, each time the device 110 detects the second gesture, the device may skip to the next previous secondary content item or the next subsequent secondary content item from the current secondary content item, allowing the user to navigate the secondary content items.

FIG. 7 illustrates a device 110 displaying an electronic book 702 with secondary content 706 that includes comprehension guides organized as footnotes 708. As illustrated in FIG. 7, the ebook 702 may include primary text 704 and multiple footnotes 708 that are detailed in the secondary content 706 section at the bottom of the page. In the alternative, the multiple footnotes 708 may be generated by the system and/or device to offer additional functionality/features to supplement the primary text 704. While this particular example illustrates translations of individual words as the footnotes 708, the disclosure is not limited and the footnotes 708 may include any additional information relevant to the primary text 704.

In this example, when the device 110 synthesizes the primary text 704, the device 110 may insert audio indicator(s) at respective location(s) of textual footnote indicator(s) within the primary text 704, for example at location 710 for footnote 1. If the device 110 detects a first gesture, the device 110 may synthesize speech corresponding to the text of the corresponding footnote 708 located in the secondary content 706 at the bottom of the page and may output the synthesized speech.

FIG. 8 illustrates a device 110 displaying an electronic book 802 with comprehension guides displayed above the corresponding word of the text as secondary content 806. As illustrated in FIG. 8, the ebook 802 may include primary text 804 with the secondary content 806 section above the corresponding word or the secondary content 806 may be generated by the system/device. As discussed above, while the secondary content 806 in this particular example consists of translations of individual words, the disclosure is not limited thereto and the secondary content 806 may include any additional information relevant to the primary text 804, such as synonyms or other content.

In this example, when the device 110 synthesizes the primary text 804, the device 110 may insert audio indicator(s) at the location(s) of item(s) of secondary content 806 within the primary text 804. If the device 110 detects a first gesture, the device 110 may synthesize the text of the corresponding secondary content item 806 and may output the synthesized text, for example as audio.

Of course, the examples shown in FIGS. 6-8 are non-limiting and secondary content may include any additional information and may be utilized and displayed in any number of ways.

Figure 9A:
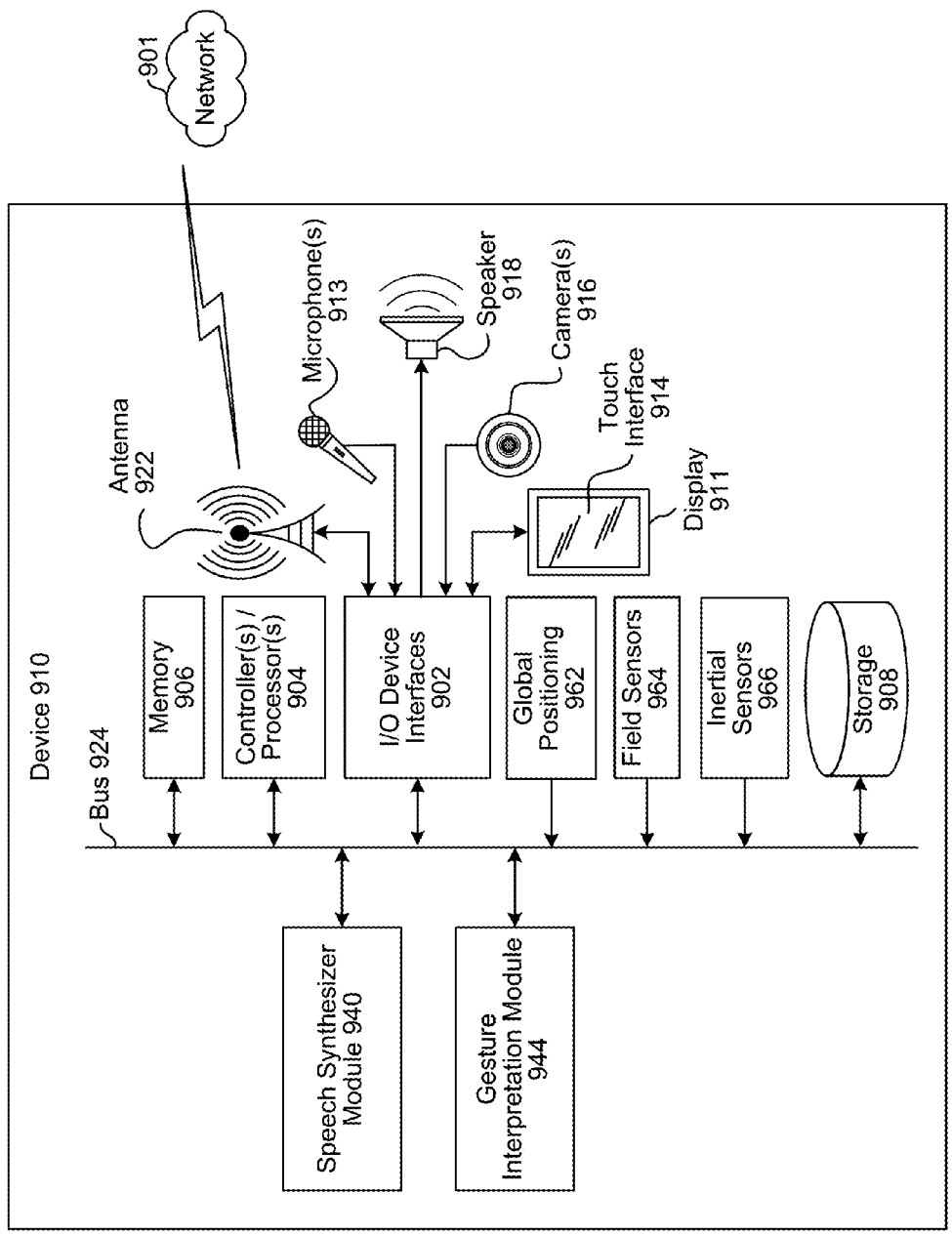
FIGS. 9A-9B illustrate block diagrams conceptually illustrating components of a system including one or more of an electronic device and a remote server.
Figure 9B:
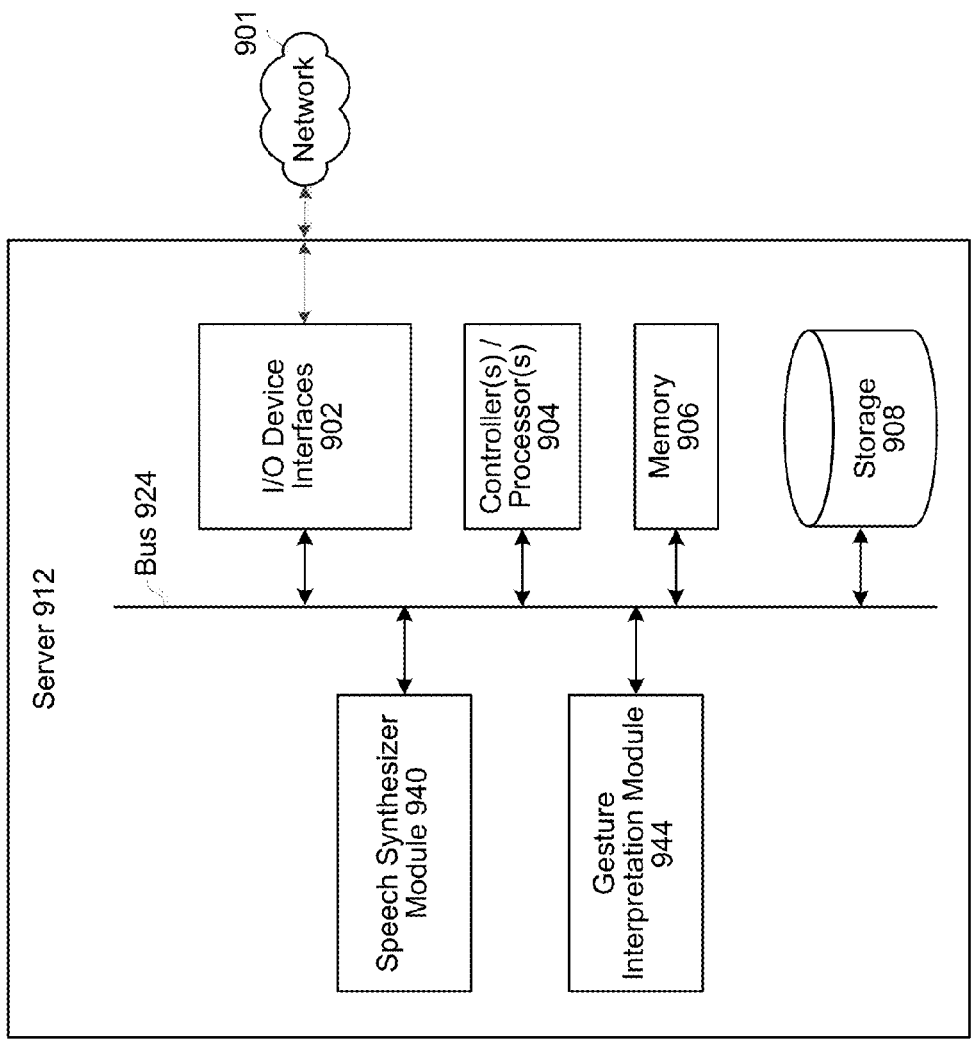

FIGS. 9A and 9B illustrate block diagrams conceptually illustrating components of a system 900 including one or more of an electronic device 910 and a remote server 912. Depending upon how the system is structured, some of the components illustrated in FIG. 9A as part of the device 910 or in FIG. 9B as part of the remote server 912 may be included only in the device 910 or in the server 912, or may be distributed across multiple devices 910 and/or servers 912. Other components not illustrated may also be included in the device 910 and/or the server 912. In operation, the system 900 may include computer-readable and computer-executable instructions that reside in storage 908 on the device 910 and/or server 912. The device 910 may be a computer, set-top box or a portable device, such as an electronic reader, a smart phone, tablet, smart watch, or the like. The server 912 may be a single server or a group of servers.

The teachings of the present disclosure may be applied within a number of different devices and computer systems, including, for example, general-purpose computing systems, server-client computing systems, mainframe computing systems, telephone computing systems, laptop computers, cellular phones, personal digital assistants (PDAs), tablet computers, other mobile devices, etc. The device 910 may also be a component of other devices or systems that may provide speech processing functionality, such as automated teller machines (ATMs), kiosks, home appliances (such as refrigerators, ovens, etc.), vehicles (such as cars, buses, motorcycles, etc.), and/or exercise equipment, for example.

The device 910 and/or server 912 may include one or more controllers/processors 904 comprising one-or-more central processing units (CPUs) for processing data and computer-readable instructions, and a memory 906 for storing data and instructions. The memory 906 may include volatile random access memory (RAM), non-volatile read only memory (ROM), non-volatile magnetoresistive (MRAM) and/or other types of memory. The device 910 and/or server 912 may also include a data storage component 908 for storing data and processor-executable instructions. The data storage component 908 may include one or more non-volatile storage types such as magnetic storage, optical storage, solid-state storage, etc. The device 910 and/or server 912 may also be connected to a removable or external non-volatile memory and/or storage (such as a removable memory card, memory key drive, networked storage, etc.) through the input/output device interfaces 902.

Executable instructions for operating the device 910 and/or server 912 and their various components may be executed by the controller(s)/processor(s) 904, using the memory 906 as temporary "working" storage at runtime. The executable instructions may be stored in a non-transitory manner in non-volatile memory 906, storage 908, or an external device. Alternatively, some or all of the executable instructions may be embedded in hardware or firmware in addition to or instead of software.

As shown in FIG. 9A, the device 910 may include one or more of a variety of sensors. Among the sensors are an audio capture component such as microphone(s) 913, an image and/or video capture component such as camera(s) 916, a touch interface 914, an antenna 922, global positioning sensors 962, field sensors 964 (e.g., a 3-axis magnetometer, a gravity sensor), and inertial sensors 966 (e.g., a 3-axis accelerometer, a 3-axis gyroscope). The device 910 may also include one or more buttons (not shown) or other input components such as a keyboard (not shown). Several of each of these components may be included. Also, although shown as integrated within device 910, some or parts of the various sensors may be external to device 910 (such as wireless headset 1004, wired headset 1006 or smartwatch 1008 in FIG. 10, etc.) and accessed through input/output device interfaces 902 either wirelessly or through a physical connection. The sensors may produce output data that may be used in determining movement signatures, as explained below.

The antenna 922 and related components (e.g., radio transmitter/receiver/transceiver, modem, etc.) may be configured to operate with a network 901, for example a wireless local area network (WLAN) (such as WiFi), Bluetooth, and/or wireless networks, such as a Long Term Evolution (LTE) network, WiMAX network, 3G network, etc.

The audio capture component may be, for example, a microphone 913 or array of microphones, a wired headset (e.g. wired headset 1006 in FIG. 10), a wireless headset (e.g., wireless headset 1004 in FIG. 10), etc. If an array of microphones is included, an approximate distance to a sound's point of origin may be determined using acoustic localization based on time and amplitude differences between sounds captured by different microphones of the array.

The touch interface 914 may be integrated with a surface of a display 911 or may be separate (e.g., a touch pad). The touch interface may be of any technology such as capacitive, resistive, optical/infrared, thermal/temperature, piezoelectric, etc. Other pointing devices for interacting with a graphical user interface (GUI) may be included, such as a touchpad, a trackball, or a mouse.

The global positioning module 962 provides an interface for acquiring location information, such as information from satellite geographic positioning system(s). For example, the global positioning module 962 may include a Global Positioning System (GPS) receiver and/or a Global Navigation Satellite System (GLONASS) receiver. The global positioning module 962 may also acquire location-based information using other radio sources (e.g., via antenna 922), such as mapping services that triangulate off of known WiFi service set identifiers (SSIDs) or cellular towers within range of the device 910.

The field sensor module 964 provides directional data. The field sensor module 964 may include a 3-axis magnetometer that measures magnetic fields and may serve as a compass. The field sensor module 964 may also include a dedicated gravity sensor to determine up-and-down. The inertial sensor module 966 provides inertial data, and may include 3-axis accelerometer and a 3-axis gyroscope. Examples of other sensors include an electronic thermometer to measure ambient temperature and a proximity sensor to detect whether there is an object within a certain distance of the device 910.

Sensors may be communicatively coupled with other components of device 910 via input/output (I/O) device interfaces 902 and/or via an address/data bus 924. The address/data bus 924 conveys data among components of the device 910 and/or server 912. Each component within the device 910 and/or server 912 may also be directly connected to other components in addition to (or instead of) being connected to other components across the bus 924.

The I/O device interfaces 902 may connect to a variety of components and networks. Among other things, the I/O device interfaces 902 may include an interface for an external peripheral device connection such as universal serial bus (USB), FireWire, Thunderbolt or other connection protocol. The input/output device interfaces 902 may also support a variety of networks via an Ethernet port and antenna 922. Examples of other I/O devices may include motion sensors, smartwatches, accelerometers, muscle movement/electrical signal monitors or any other devices configured to detect movement and/or gestures.

The device 910 may also include a video output component for displaying images, such as display 911. The video output component may be a display of any suitable technology, such as a liquid crystal display, an organic light emitting diode display, electronic paper, an electrochromic display, a pico projector, etc. The video output component may be integrated into the device 910 or may be separate.

Figure 10:
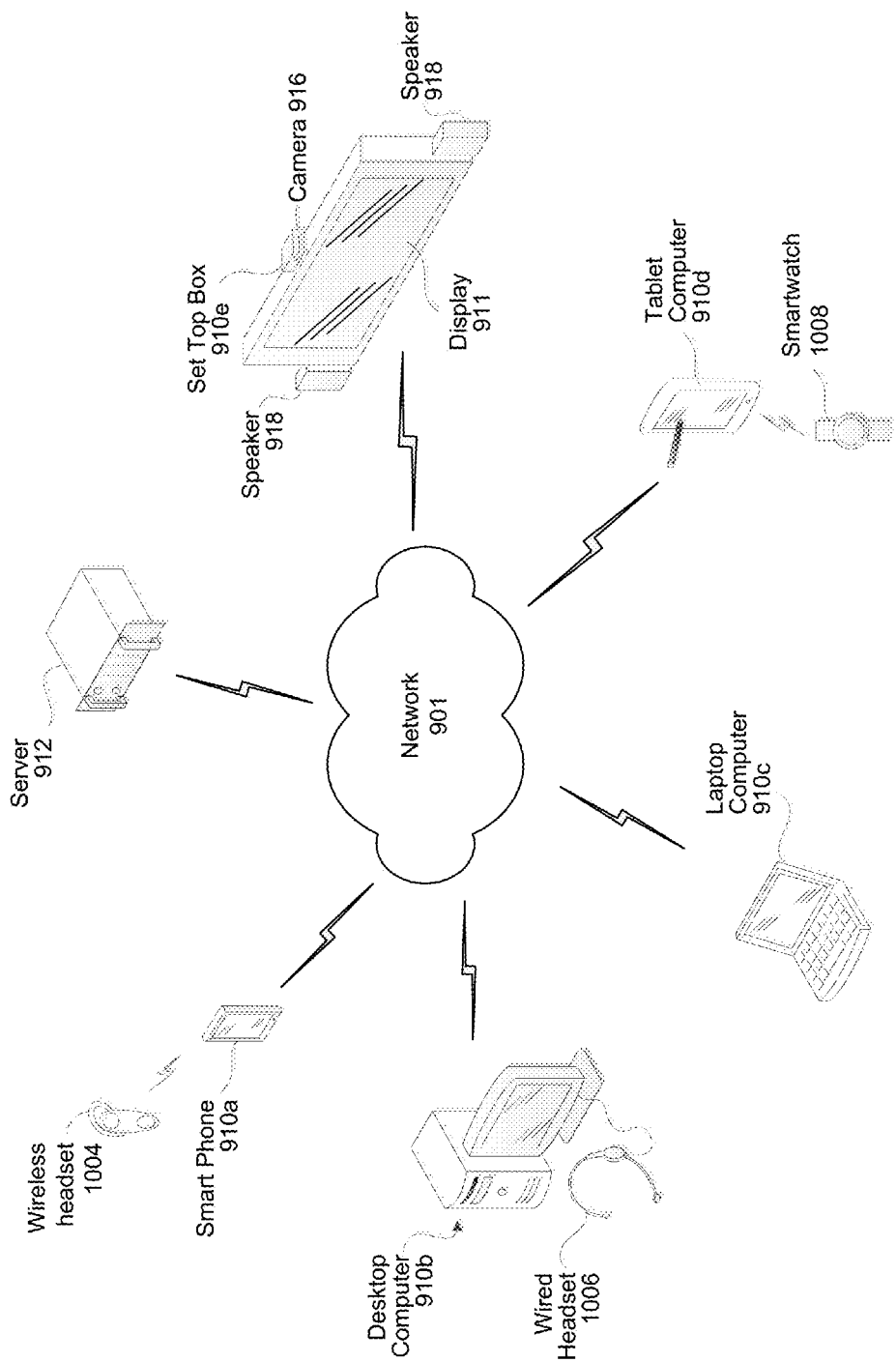
FIG. 10 illustrates a network diagram including multiple devices connected over a network.

The device 910 may also include an audio output component such as a speaker 918, a wired headset (e.g. wired headset 1006 in FIG. 10), or a wireless headset (e.g., wireless headset 1004 in FIG. 10). Other output devices include a haptic effect generator (not illustrated). The haptic effect generator may be of any haptic technology, including technologies to vibrate the entire device 910 (e.g., electromagnetic technologies such as vibratory motor or a coil with a central mass) and/or may comprise technologies allowing the haptic effect to be localized to a position of the touch interface 914, such as electroactive polymers, piezoelectrics, electrostatics, subsonic audio wave surface actuation, etc.

As discussed above, device 910 and/or server 912 includes controller(s)/processors 904, memory 906, and storage 908. In addition, the device 910 and/or server 912 may include a speech synthesizer module 940 and a gesture interpretation module 944, each of which may comprise processor-executable instructions stored in storage 908 to be executed by controller(s)/processor(s) 904 (e.g., software, firmware), hardware, or some combination thereof. For example, components of the speech synthesizer module 940 and the gesture interpretation module 944 may be part of a software application running in the foreground and/or background on the device 910. In another example, a gesture interpretation module 944 may reside on a device 910 whereas a speech synthesizer module 940 may reside on server 912. Other configurations are also possible.

The speech synthesizer module 940 may be configured to receive various inputs having text and may analyze the text in order to synthesize the text and generate speech. Text received by the speech synthesizer module 940 may be received by a front-end for processing. The front-end may be included in the speech synthesizer module 940. The front-end may include modules for performing text normalization, linguistic analysis, and linguistic prosody generation. During text normalization, the front-end processes the text input and generates standard text, converting such things as numbers, abbreviations (such as Apt., St., etc.), symbols ($, %, etc.) into the equivalent of written out words.

During linguistic analysis the front end analyzes the language in the normalized text to generate a sequence of phonetic units corresponding to the input text. This process may be referred to as phonetic transcription. Phonetic units include symbolic representations of sound units to be eventually combined and output as speech. Various sound units may be used for dividing text for purposes of speech synthesis. The speech synthesizer module 940 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary. The linguistic analysis performed may also identify different grammatical components such as prefixes, suffixes, phrases, punctuation, syntactic boundaries, or the like. Such grammatical components may be used by the speech synthesizer module 940 to craft a natural sounding audio waveform output. The language dictionary may also include letter-to-sound rules and other tools that may be used to pronounce previously unidentified words or letter combinations that may be encountered by the speech synthesizer module 940. Generally, the more information included in the language dictionary, the higher quality the speech output.

Based on the linguistic analysis the front end may then perform linguistic prosody generation where the phonetic units are annotated with desired prosodic characteristics, also called acoustic features, which indicate how the desired phonetic units are to be pronounced in the eventual output speech. During this stage the front end may consider and incorporate any prosodic annotations that accompanied the text input to the speech synthesizer module 940. Such acoustic features may include pitch, energy, duration, tone, and the like. Application of acoustic features may be based on prosodic models available to the speech synthesizer module 940. Such prosodic models indicate how specific phonetic units are to be pronounced in certain circumstances. A prosodic model may consider, for example, linguistic features such as a phoneme's position in a syllable, a syllable's position in a word, a word's position in a sentence or phrase, neighboring phonetic units, the phoneme's part of speech, etc. As with the language dictionary, prosodic model with more information may result in higher quality speech output than prosodic models with less information.

The output of this processing, referred to as a symbolic linguistic representation, may include a sequence of phonetic units annotated with prosodic characteristics. This symbolic linguistic representation may be sent to a speech synthesis engine (also known as a synthesizer) included in the speech synthesizer module 940, for conversion into an audio waveform of speech for eventual output. The symbolic linguistic representation may include textual indicators corresponding to secondary content as described above. These textual indicators may be formatted according to a speech synthesis markup language (SSML). These textual indicators may be processed by the speech synthesizer module 940 to insert audio indicators in the output speech.

Actual speech synthesis may be performed in a number of ways. In one way, called parametric synthesis, various speech parameters may be used to create audio using a machine voice synthesizer, called a vocoder. Another technique called unit selection, is more processor/memory/computing-resource intensive, however it produces more natural sounding speech. During unit selection, the speech synthesizer module 940 matches a database of recorded speech (called a voice corpus) against the symbolic linguistic representation of incoming text, such as a symbolic linguistic representation created by a front end, discussed above.

The voice corpus may include many hours of recorded speech (in the form of audio waveforms, feature vectors, or other formats), which may occupy a significant amount of storage. The recorded speech is typically divided into small segments called unit samples or units. The unit samples may be classified in a variety of ways including by phonetic unit (phoneme, diphone, triphone, word, etc.), linguistic prosodic label, acoustic feature sequence, speaker identity, etc. Each unit includes an audio waveform corresponding with a phonetic unit, such as a short audio segment of the specific sound, along with a description of the various acoustic features associated with the .wav file (such as its pitch, energy, etc.), as well as other information, such as where the phonetic unit appears in a word, sentence, or phrase, the neighboring phonetic units, etc. The voice corpus may include multiple examples of phonetic units to provide the TTS system with many different options for concatenating units into speech. Generally the larger the voice corpus, the better the speech synthesis may be achieved by virtue of the greater number of unit samples that may be selected to form the precise desired speech output.

Using all the information in the voice corpus, the speech synthesizer module 940 may match units of the voice corpus to the symbolic linguistic representation of input text (including both phonetic units and prosodic annotations). Matching units are selected and concatenated together to create a natural sounding waveform for the speech output.

The speech synthesizer module 940 may insert pauses in the synthesized speech at location(s) of secondary content item(s) and may insert audio indicator(s) corresponding to the secondary content item(s). Indicators for these pauses may be included in the symbolic linguistic representation discussed above and may be converted to pauses during speech synthesis. In certain embodiments, operations of the speech synthesizer module 940 may be performed remotely. For example, if a first speech synthesizer module 940 is located on a remote server 912, the first speech synthesizer 940 on the remote server 912 may output analyzed text (such as a symbolic linguistic representation) to a second speech synthesizer 940 on a local device 910. Thus, instead of streaming the generated audio, the remote server 912 may stream the analyzed text and reduce a bandwidth requirement for the local device 910.

The gesture interpretation module 944 may be configured to receive various inputs, such as location data of a subject from a touchscreen, a camera, a motion detector or other device and to interpret the location data of the subject as being a desired gesture. For example, the gesture interpretation module 944 may receive location data from a touchscreen that corresponds to contact between the user and the touchscreen. Based on the location data, the gesture interpretation module 944 may identify a desired gesture and output a command based on the desired gesture.

The speech synthesizer module 940 and the gesture interpretation module 944 may be connected to the bus 924, input/output interfaces 902, controller/processor 904, and/or other component of the device 910 and/or server 912. For example, text sent to the speech synthesizer module may come from the storage 908 or the input/output interfaces 902, such as text data sent to the device 910 and/or server 912 over a network. Data sent to the gesture interpretation module 944 may come from the input/output interfaces 902, such as location data captured by the touch interface 914 and/or the camera(s) 916, as well as any other component located in the device 910.

As shown in FIG. 10, multiple devices may be connected over a network 901. The network 901 may include a local or private network or may include a wide network such as the internet. Devices may be connected to the network 901 through either wired or wireless connections. For example, a smart phone 910a may be connected to the network 901 through a wireless service provider, over a WiFi connection, and/or the like. Other devices, such as desktop computer 910b and/or server 912, may connect to the network 901 through a wired connection. Other devices, such as laptop computer 910c, tablet computer 910d or set top box 910e may be capable of connection to the network 901 using various connection methods including through a wireless service provider, over a WiFi connection, or the like. The tablet computer 901d may be coupled to a smartwatch 1008 configured to detect gesture(s) and provide location data and/or movement data corresponding to the gesture(s) to the tablet computer 910d. The tablet computer 910d may receive the location data and/or movement data from the smartwatch 1008 and may interpret the location data and/or movement data as one or more gestures. Networked devices may output spoken audio through a number of audio output devices including through headsets 1004 or 1006. Audio output devices may be connected to networked devices either through a wired or wireless connection. Networked devices may also include embedded audio output devices, such as an internal speaker (not pictured) in laptop computer 910c, smart phone 910a, or tablet computer 910d.

In certain speech synthesizing system configurations, one device may perform some or all of the speech synthesizing and other device(s) may perform the remaining speech synthesizing and/or output audio signals. For example, a server 912 may perform text analysis and linguistic analysis on a text segment having secondary content item(s), may generate waveforms to create synthesized speech and may output the synthesized speech over the network 901 to a tablet computer 910d. The tablet computer 910d may output audio including the speech callback(s) and/or the audio indicator(s) at respective locations in the synthesized speech based on a location of the corresponding secondary content item(s) in the text. Alternatively, to reduce a size of the data being transmitted from the server 912, the server 912 may perform text analysis and linguistic analysis on the text segment having secondary content item(s) and may output the analyzed text, along with optional speech callback(s) and/or audio indicator(s), over the network 901 to a laptop computer 910*d*. The laptop computer 910*c* may generate waveforms to create synthesized speech and may output audio including the speech callback(s) and/or the audio indicator(s) at respective locations in the synthesized speech based on a location of the corresponding secondary content item(s) in the text.

Because speech processing may involve significant computational resources, in terms of both storage and processing power, such split configurations may be employed where the device outputting the audio has lower processing capabilities than a remote device and/or higher quality results are desired. Thus, remote devices such as the server 912 may perform some or all of the speech synthesizing process to reduce the processor-intensive steps performed on the local device 910. As a result, the speech synthesizing and/or audio data may be of higher quality using the server 912 or may reduce the processing requirements of the local device 910 without lowering the quality of the speech synthesizing and/or the audio data. Further, the amount of processing performing by the server 912 may be adjusted to reduce a bandwidth requirement of streaming the data from the server 912 to the local device 910.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art.

Aspects of the present disclosure may be implemented as a computer implemented method, a system, or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid state memory, flash drive, removable disk, and/or other media.

Aspects of the present disclosure may be performed in different forms of software, firmware, and/or hardware. Further, the teachings of the disclosure may be performed by an application specific integrated circuit (ASIC), field programmable gate array (FPGA), or other component, for example.

Aspects of the present disclosure may be performed on a single device or may be performed on multiple devices. For example, program modules including one or more components described herein may be located in different devices and may each perform one or more aspects of the present disclosure. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for audibly indicating footnotes in text during text-to-speech processing, the method comprising:
   obtaining a target sentence to convert from text to speech, the target sentence including primary text and a footnote associated with the primary text;
   identifying a textual indicator associated with the footnote in the primary text;
   generating first speech data corresponding to a first portion of the primary text, the first portion preceding the textual indicator;
   generating second speech data corresponding to a second portion of the primary text, the second portion following the textual indicator;
   generating an audio tone corresponding to the textual indicator, the audio tone comprising a beeping sound; and
   outputting first audio including the first speech data, followed by the audio tone, then followed by the second speech data.

2. The computer-implemented method of claim 1, further comprising:
   detecting contact on a touchscreen of a computing device within a first period of time following output of the audio tone;
   determining that the contact corresponds to a first arc gesture, the contact traveling along both a horizontal axis of the touchscreen and a vertical axis of the touchscreen from a first point on the touchscreen to a second point on the touchscreen, a difference between a first horizontal coordinate associated with the first point and a second horizontal coordinate associated with the second point exceeding a horizontal threshold, and a difference between a first vertical coordinate associated with the first point and a second vertical coordinate associated with a midpoint of the contact exceeding a vertical threshold;
   identifying supplemental text associated with the footnote in response to the first arc gesture;
   generating supplemental speech data corresponding to the supplemental text in response to the first arc gesture; and
   outputting second audio including the supplemental speech data in response to the first arc gesture.

3. The computer-implemented method of claim 1, wherein the first audio includes a delay between the first speech data and the second speech data, the delay corresponding to a length of the audio tone.

4. A computing system comprising:
   one or more processors; and
   a memory including instructions operable to be executed by the one or more processors to perform a set of actions to configure the system to:
      identify a textual indicator of secondary content in a string of text, the string of text including a first string prior to the textual indicator and a second string subsequent to the textual indicator, wherein the secondary content is at least one of data relating to formatting of the string of text or additional data associated with the string of text; and
      output first audio including an audio tone preceded by first speech and followed by second speech, the first speech corresponding to the first string, the second speech corresponding to the second string, the audio tone associated with the textual indicator and based on a type of the secondary content.

5. The system of claim 4, wherein the instructions further configure the system to:
   insert the textual indicator in the string of text based on a location of the secondary content within the string of text.

6. The system of claim 4, wherein the instructions further configure the system to:

determine the type of the secondary content;
select one of a plurality of audio signals as the audio tone based on the type of the secondary content;
generate the audio tone;
generate the first speech based on the first string; and
generate the second speech based on the second string.

7. The system of claim 4, wherein the first audio includes a delay between the first speech data and the second speech data, the delay corresponding to a length of the audio tone.

8. The system of claim 4, wherein a moment of the audio tone in the first audio corresponds to a location of the textual indicator in the string of text.

9. The system of claim 8, wherein the instructions further configure the system to:
receive an input requesting the secondary content; and
output third speech corresponding to text associated with the secondary content, wherein the third speech has different voice parameters than at least one of the first speech and the second speech.

10. The system of claim 4, wherein the instructions further configure the system to output a haptic at substantially a same time of output of the audio tone.

11. The system of claim 4, wherein the secondary content includes at least one of a footnote, an endnote, a definition, a synonym, or a translation.

12. A computer-implemented method comprising:
identifying a textual indicator of secondary content in a string of text, the string of text including a first string prior to the textual indicator and a second string subsequent to the textual indicator, wherein the secondary content is at least one of data relating to formatting of the string of text or additional data associated with the string of text; and
outputting first audio including an audio tone corresponding to the textual indicator that is preceded by first speech corresponding to the first string and followed by second speech corresponding to the second string, the audio tone based on a type of the secondary content.

13. The computer-implemented method of claim 12, further comprising:
inserting the textual indicator in the string of text based on a location of the secondary content within the string of text.

14. The computer-implemented method of claim 12, further comprising:
determining the type of the secondary content;
selecting one of a plurality of audio signals as the audio tone based on the type of the secondary content;
generating the audio tone;
generating the first speech based on the first string; and
generating the second speech based on the second string.

15. The computer-implemented method of claim 12, wherein the first audio includes a delay between the first speech data and the second speech data, the delay corresponding to a length of the audio tone.

16. The computer-implemented method of claim 12, wherein a moment of the audio tone in the first audio corresponds to a location of the textual indicator in the string of text.

17. The computer-implemented method of claim 16, further comprising:
receiving an input requesting the secondary content; and
outputting third speech corresponding to text associated with the secondary content, wherein the third speech has different voice parameters than at least one of the first speech and the second speech.

18. The computer-implemented method of claim 17, wherein the third speech is output after the first speech but prior to the second speech.

19. The computer-implemented method of claim 12, further comprising:
outputting a haptic at substantially a same time of output of the audio tone.

20. The computer-implemented method of claim 12, wherein the secondary content includes at least one of a footnote, an endnotes, a definition, a synonym, or a translation.

* * * * *